US010834204B2

(12) United States Patent
Ishikawa et al.

(10) Patent No.: US 10,834,204 B2
(45) Date of Patent: Nov. 10, 2020

(54) TRANSMITTING DISPLAY INFORMATION BASED ON COMMUNICATION PROTOCOLS

(71) Applicant: Sony Corporation, Tokyo (JP)

(72) Inventors: Hirotaka Ishikawa, Kanagawa (JP); Takeshi Iwatsu, Kanagawa (JP); Kenji Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 984 days.

(21) Appl. No.: 14/379,778

(22) PCT Filed: Dec. 10, 2012

(86) PCT No.: PCT/JP2012/081919
§ 371 (c)(1),
(2) Date: Aug. 20, 2014

(87) PCT Pub. No.: WO2013/128750
PCT Pub. Date: Sep. 6, 2013

(65) Prior Publication Data
US 2015/0032856 A1 Jan. 29, 2015

(30) Foreign Application Priority Data

Mar. 1, 2012 (JP) .................... 2012-045311

(51) Int. Cl.
*H04L 29/08* (2006.01)
*H04L 29/06* (2006.01)
(Continued)

(52) U.S. Cl.
CPC ........ *H04L 67/141* (2013.01); *H04L 67/1095* (2013.01); *H04L 67/36* (2013.01);
(Continued)

(58) Field of Classification Search
CPC .............. H04L 67/141; H04L 67/1095; H04N 21/2408; H04N 21/4884; H04N 21/44245; G06F 13/00
(Continued)

(56) References Cited

U.S. PATENT DOCUMENTS 7,080,399 B1 * 7/2006 Yanagawa ................. H04Q 9/00
725/109
7,111,315 B1 * 9/2006 Tsurumoto ............. H04H 20/59
725/39
(Continued)

FOREIGN PATENT DOCUMENTS

JP 2002-153684 A 5/2002
JP 2008-226127 A 9/2008
(Continued)

OTHER PUBLICATIONS

U.S. Appl. No. 61/592,674; Specification and Drawings; Priority for Redmann US 2014/0348491 A1.*

*Primary Examiner* — Kamal B Divecha
*Assistant Examiner* — Clifton Houston
(74) *Attorney, Agent, or Firm* — Chip Law Group

(57) ABSTRACT

Interruption of the distribution of display information is prevented. A message processing section, in a case where a connection has been established with a server which distributes display information to be displayed on a display device in synchronization with reproduction of content, processes a message from the server for controlling the distribution in accordance with a first protocol. A connection confirmation section confirms whether or not the connection has been established in accordance with a second protocol. A connection request section, in a case where the connection
(Continued)

has not been established, requests establishment of the connection to the server in accordance with the second protocol.

9 Claims, 22 Drawing Sheets

(51) Int. Cl.
 *H04N 21/488* (2011.01)
 *H04N 21/24* (2011.01)
(52) U.S. Cl.
 CPC .............. *H04L 69/14* (2013.01); *H04L 69/18* (2013.01); *H04N 21/2408* (2013.01); *H04N 21/4884* (2013.01)
(58) Field of Classification Search
 USPC ........................................................ 709/219
 See application file for complete search history.

(56) References Cited

U.S. PATENT DOCUMENTS

| | | | | |
|---|---|---|---|---|
| 2002/0038460 A1* | 3/2002 | Kimoto | .............. | H04N 7/17318 725/109 |
| 2002/0101537 A1* | 8/2002 | Basson | .................. | H04N 5/445 348/465 |
| 2004/0083301 A1* | 4/2004 | Murase | ............ | H04N 21/23805 709/231 |
| 2005/0108026 A1* | 5/2005 | Brierre | .................. | G06Q 50/10 725/137 |
| 2006/0168235 A1* | 7/2006 | Sekiguchi | ................ | H04L 67/14 709/227 |
| 2008/0056214 A1* | 3/2008 | Low | ....................... | H04W 48/16 370/338 |
| 2009/0028145 A1* | 1/2009 | Shibasaki | ............... | H04L 67/14 370/389 |
| 2010/0060552 A1* | 3/2010 | Watanabe | ............ | G02B 27/017 345/8 |
| 2010/0165194 A1* | 7/2010 | He | ........................ | H04N 21/435 348/468 |
| 2011/0010743 A1* | 1/2011 | Fournier | ............. | H04L 65/4076 725/62 |
| 2011/0058500 A1* | 3/2011 | Nagasaki | ............... | H04W 8/183 370/254 |
| 2011/0069230 A1* | 3/2011 | Polumbus | .......... | H04N 21/2353 348/468 |
| 2012/0170906 A1* | 7/2012 | Soroushian | .......... | H04N 21/435 386/241 |
| 2012/0218171 A1* | 8/2012 | Fujigaki | .................... | G06F 3/14 345/8 |
| 2013/0114432 A1* | 5/2013 | Haynes | ................. | H04L 67/141 370/252 |
| 2013/0293777 A1* | 11/2013 | Huber | .................... | G03B 21/00 348/468 |
| 2014/0348491 A1* | 11/2014 | Redmann | ........... | H04N 21/2143 386/249 |

FOREIGN PATENT DOCUMENTS

| | | |
|---|---|---|
| JP | 2011-151651 A | 8/2011 |
| JP | 2011-221236 A | 11/2011 |

* cited by examiner

FIG. 7

```
<?xml version="1.0" encoding="UTF-8" ?>
- <rpl:ResourcePresentationList PlayoutID="3" xsi:schemaLocation="http://www.smpte-ra.org/schemas/430-
11/2009/resourcePresentationList ResourcePresentationList.xsd" xmlns:rpl="http://www.smpte-ra.org/
schemas/430-11/2009/resourcePresentationList" xmlns:xsi="http://www.w3.org/2001/XMLSchema-
instance">
  - <ReelResources TimelineOffset="0" ReelID="urn:uuid:05289F5C-89FD-5243-8AC5-0B84A4BFFB0E"
EditRate="24 1">
    - <ReelResource Id="urn:uuid:702f6699-6580-4ec4-84e9-9c1df5f15ba5" ResourceType="ClosedCaption"
Language="en" Duration="2880" IntrinsicDuration="2880">
        <ResourceFile>http://192.168.1.51:80/RPL1/cc_1.xml</ResourceFile>
      </ReelResource>                                    ⤳262
    - <ReelResource Id="urn:uuid:fb268118-366d-4421-848f-d64b7f57f2a4" ResourceType="ClosedCaption"
Language="fr" Duration="2880" IntrinsicDuration="2880">
        <ResourceFile>http://192.168.1.51:80/RPL1/cc_2.xml</ResourceFile>
      </ReelResource>                                    ⤳263
    - <ReelResource Id="urn:uuid:a8e584fc-8265-4004-9db5-6370a3350e9d" ResourceType="ClosedCaption"
Language="de" Duration="2880" IntrinsicDuration="2880">
        <ResourceFile>http://192.168.1.51:80/RPL1/cc_3.xml</ResourceFile>
      </ReelResource>                                    ⤳264
    - <ReelResource Id="urn:uuid:37fb59f0-5a71-4dc2-b2e4-4fea2114fbb5" ResourceType="ClosedCaption"
Language="it" Duration="2880" IntrinsicDuration="2880">
        <ResourceFile>http://192.168.1.51:80/RPL1/cc_4.xml</ResourceFile>
      </ReelResource>
    - <ReelResource Id="urn:uuid:057d197d-a9eb-4b8f-b936-b76bb580bffb" ResourceType="ClosedCaption"
Language="ja" Duration="2880" IntrinsicDuration="2880">
        <ResourceFile>http://192.168.1.51:80/RPL1/cc_5.xml</ResourceFile>
      </ReelResource>
    - <ReelResource Id="urn:uuid:c747a884-f744-45a0-80a7-46f3562157ce" ResourceType="ClosedCaption"
Language="ko" Duration="2880" IntrinsicDuration="2880">
        <ResourceFile>http://192.168.1.51:80/RPL1/cc_6.xml</ResourceFile>
      </ReelResource>
    </ReelResources>
  - <ReelResources TimelineOffset="2880" ReelID="urn:uuid:97D37EA6-2C59-174C-9EF6-6008CA87D5AC"
EditRate="24 1">
    - <ReelResource Id="urn:uuid:FF2f6699-6580-4ec4-84e9-9c1df5f15FFF" ResourceType="ClosedCaption"
Language="en" Duration="2880" IntrinsicDuration="2880">
        <ResourceFile>http://192.168.1.51:80/RPL1/cc_1_2reel.xml</ResourceFile>
      </ReelResource>
    - <ReelResource Id="urn:uuid:FF268118-366d-4421-848f-d64b7f57fFFF" ResourceType="ClosedCaption"
Language="fr" Duration="2880" IntrinsicDuration="2880">
        <ResourceFile>http://192.168.1.51:80/RPL1/cc_2_2reel.xml</ResourceFile>
      </ReelResource>
    - <ReelResource Id="urn:uuid:FFe584fc-8265-4004-9db5-6370a3350FFF" ResourceType="ClosedCaption"
Language="de" Duration="2880" IntrinsicDuration="2880">
        <ResourceFile>http://192.168.1.51:80/RPL1/cc_3_2reel.xml</ResourceFile>
      </ReelResource>
    - <ReelResource Id="urn:uuid:FFfb59f0-5a71-4dc2-b2e4-4fea2114fFFF" ResourceType="ClosedCaption"
Language="it" Duration="2880" IntrinsicDuration="2880">
        <ResourceFile>http://192.168.1.51:80/RPL1/cc_4_2reel.xml</ResourceFile>
      </ReelResource>
    - <ReelResource Id="urn:uuid:FF7d197d-a9eb-4b8f-b936-b76bb580bFFF" ResourceType="ClosedCaption"
Language="ja" Duration="2880" IntrinsicDuration="2880">
        <ResourceFile>http://192.168.1.51:80/RPL1/cc_5_2reel.xml</ResourceFile>
      </ReelResource>
    - <ReelResource Id="urn:uuid:FF47a884-f744-45a0-80a7-46f356215FFF" ResourceType="ClosedCaption"
Language="ko" Duration="2880" IntrinsicDuration="2880">
        <ResourceFile>http://192.168.1.51:80/RPL1/cc_6_2reel.xml</ResourceFile>
      </ReelResource>
    </ReelResources>
</rpl:ResourcePresentationList>
```

```xml
<?xml version="1.0" encoding="UTF-8" ?>
<SubtitleReel xmlns="http://www.smpte-ra.org/schemas/428-7/2007/DCST">
<Id>urn:uuid:702f6699-6580-4ec4-84e9-9c1df5f15ba5</Id>
<ContentTitleText>TestMovie</ContentTitleText>
<IssueDate>2009-04-15T09:49:49.468Z</IssueDate>
<ReelNumber>1</ReelNumber>
<Language>en</Language>
<EditRate>24 1</EditRate>
<TimeCodeRate>24</TimeCodeRate>
<StartTime>00:00:00:00</StartTime>
<LoadFont ID="arial.ttf">urn:uuid:fb268118-366d-4421-848f-d64b7f57f2a4</LoadFont>
<SubtitleList>
  <Font ID="arial.ttf" Color="ffffffff" Weight="normal" Italic="no" Size="40">
    <Subtitle SpotNumber="1" TimeIn="00:00:01:00" TimeOut="00:00:02:10">
       <Text Halign="center" Valign="bottom" Vposition="20">test subtitle 1</Text>
       <Text Halign="center" Valign="bottom" Vposition="10">time 00:00:01</Text>
    </Subtitle>
    <Subtitle SpotNumber="2" TimeIn="00:00:03:00" TimeOut="00:00:04:10">
       <Text Halign="center" Valign="bottom" Vposition="20">test subtitle 2</Text>
       <Text Halign="center" Valign="bottom" Vposition="10">time 00:00:03</Text>
    </Subtitle>
    <Subtitle SpotNumber="3" TimeIn="00:00:05:00" TimeOut="00:00:06:10">
       <Text Halign="center" Valign="bottom" Vposition="20">test subtitle 3</Text>
       <Text Halign="center" Valign="bottom" Vposition="10">time 00:00:05</Text>
    </Subtitle>
    <Subtitle SpotNumber="4" TimeIn="00:00:07:00" TimeOut="00:00:08:10">
       <Text Halign="center" Valign="bottom" Vposition="20">test subtitle 4</Text>
       <Text Halign="center" Valign="bottom" Vposition="10">time 00:00:07</Text>
    </Subtitle>
    <Subtitle SpotNumber="5" TimeIn="00:00:09:00" TimeOut="00:00:10:10">
       <Text Halign="center" Valign="bottom" Vposition="20">test subtitle 5</Text>
       <Text Halign="center" Valign="bottom" Vposition="10">time 00:00:09</Text>
    </Subtitle>
    <Subtitle SpotNumber="6" TimeIn="00:00:11:00" TimeOut="00:00:12:10">
       <Text Halign="center" Valign="bottom" Vposition="20">test subtitle 6</Text>
       <Text Halign="center" Valign="bottom" Vposition="10">time 00:00:11</Text>
    </Subtitle>
    <Subtitle SpotNumber="7" TimeIn="00:00:13:00" TimeOut="00:00:14:10">
       <Text Halign="center" Valign="bottom" Vposition="20">test subtitle 7</Text>
       <Text Halign="center" Valign="bottom" Vposition="10">time 00:00:13</Text>
    </Subtitle>
    <Subtitle SpotNumber="8" TimeIn="00:00:15:00" TimeOut="00:00:16:10">
       <Text Halign="center" Valign="bottom" Vposition="20">test subtitle 8</Text>
       <Text Halign="center" Valign="bottom" Vposition="10">time 00:00:15</Text>
    </Subtitle>
    <Subtitle SpotNumber="9" TimeIn="00:00:17:00" TimeOut="00:00:18:10">
       <Text Halign="center" Valign="bottom" Vposition="20">test subtitle 9</Text>
       <Text Halign="center" Valign="bottom" Vposition="10">time 00:00:17</Text>
    </Subtitle>
  </Font>
</SubtitleList>
</SubtitleReel>
```

FIG. 10

| MESSAGE NAME | DESCRIPTION |
| --- | --- |
| ANNOUNCEMENT (Announce) | MESSAGE TRANSMITTED IN ORDER TO CONFIRM THAT DEVICE OF RECEPTION SIDE (SUCH AS SUBTITLE DATA TRANSMISSION APPARATUS) CAN INTERPRET SMPTE PROTOCOL |
| NEW LEASE ACQUISITION REQUEST (Get New Lease request) | MESSAGE TRANSMITTED IN ORDER TO SET LEASE TIME PERIOD OF COMMUNICATION CHANNEL |
| STATUS ACQUISITION REQUEST (Get Status request) | MESSAGE TRANSMITTED IN ORDER TO ACQUIRE PRESENT STATUS OF ACS (SUCH AS SUBTITLE DATA TRANSMISSION APPARATUS) |
| RPL RETAINING LOCATION SETTING REQUEST (Set RPL Location request) | MESSAGE WHICH PRESENTS RETAINING LOCATION OF RETAINING LOCATION PRESENTATION FILE (RPL FILE) |
| OUTPUT MODE SETTING REQUEST (Set Output Mode request) | MESSAGE WHICH SPECIFIES WHETHER OR NOT OUTPUT OF RESOURCE (SUCH AS SUBTITLES) IS ENABLED TO ACS (SUCH AS SUBTITLE DATA TRANSMISSION APPARATUS) |
| TIMELINE UPDATE REQUEST (Update Timeline request) | MESSAGE WHICH PRESENTS PRESENT POSITION IN TIMELINE |
| LEASE END REQUEST (Terminate Lease request) | MESSAGE WHICH SPECIFIES LEASE END AND DISCARDING OF ALL DATA RELATED TO PRESENT LEASE |

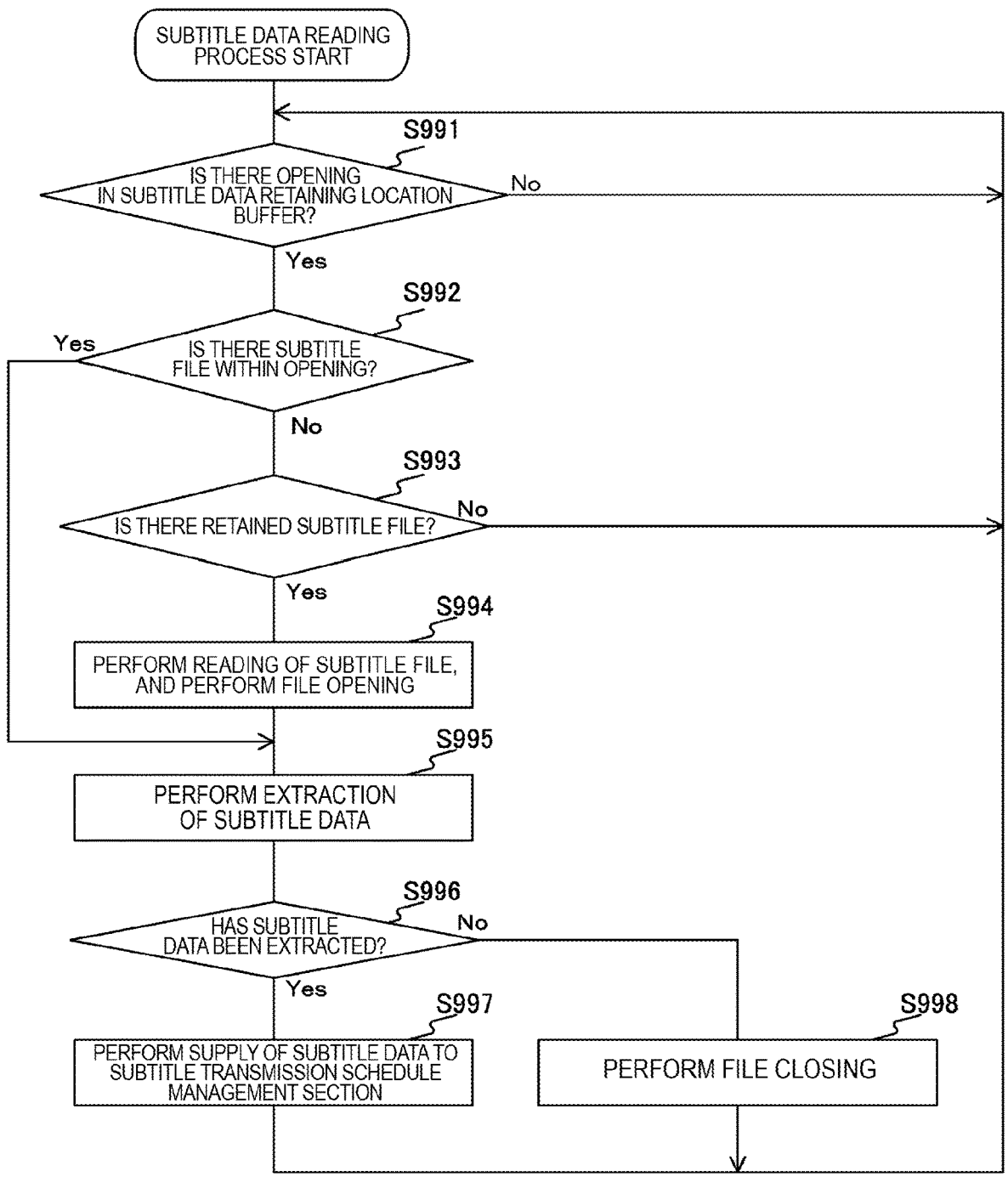

FIG. 22

```
<?xml version="1.0" encoding="UTF-8" ?>
- <DCSubtitle Version="1.0">
    <SubtitleID>urn:uuid:702f6699-6580-4ec4-84e9-9c1df5f15ba5</SubtitleID>
    <MovieTitle>Closed Caption Test Content 3</MovieTitle>
    <Language>English</Language>
    <ReelNumber>1</ReelNumber>
    <LoadFont Id="arial.ttf" URI="arial.ttf" />
  - <Font Id="arial.ttf" Color="ffffffff" Italic="no" Size="40">
    - <Subtitle SpotNumber="1" TimeIn="00:00:01:000" TimeOut="00:00:02:000">
        <Text HAlign="center" VAlign="bottom" VPosition="20">Closed Caption Test Content 1</Text>
        <Text HAlign="center" VAlign="bottom" VPosition="10">Current Time 00:00:01</Text>
      </Subtitle>
    - <Subtitle SpotNumber="2" TimeIn="00:00:03:000" TimeOut="00:00:04:000">
        <Text HAlign="center" VAlign="bottom" VPosition="20">Closed Caption Test Content 1</Text>
        <Text HAlign="center" VAlign="bottom" VPosition="10">Current Time 00:00:03</Text>
      </Subtitle>
    - <Subtitle SpotNumber="3" TimeIn="00:00:05:000" TimeOut="00:00:06:000">
        <Text HAlign="center" VAlign="bottom" VPosition="20">Closed Caption Test Content 1</Text>
        <Text HAlign="center" VAlign="bottom" VPosition="10">Current Time 00:00:05</Text>
      </Subtitle>
    - <Subtitle SpotNumber="4" TimeIn="00:00:07:000" TimeOut="00:00:08:000">
        <Text HAlign="center" VAlign="bottom" VPosition="20">Closed Caption Test Content 1</Text>
        <Text HAlign="center" VAlign="bottom" VPosition="10">Current Time 00:00:07</Text>
      </Subtitle>
        .
        .
        .
    - <Subtitle SpotNumber="57" TimeIn="00:01:53:000" TimeOut="00:01:54:000">
        <Text HAlign="center" VAlign="bottom" VPosition="20">Closed Caption Test Content 1</Text>
        <Text HAlign="center" VAlign="bottom" VPosition="10">Current Time 00:01:53</Text>
      </Subtitle>
    - <Subtitle SpotNumber="58" TimeIn="00:01:55:000" TimeOut="00:01:56:000">
        <Text HAlign="center" VAlign="bottom" VPosition="20">Closed Caption Test Content 1</Text>
        <Text HAlign="center" VAlign="bottom" VPosition="10">Current Time 00:01:55</Text>
      </Subtitle>
    - <Subtitle SpotNumber="59" TimeIn="00:01:57:000" TimeOut="00:01:58:000">
        <Text HAlign="center" VAlign="bottom" VPosition="20">Closed Caption Test Content 1</Text>
        <Text HAlign="center" VAlign="bottom" VPosition="10">Current Time 00:01:57</Text>
      </Subtitle>
    - <Subtitle SpotNumber="60" TimeIn="00:01:59:000" TimeOut="00:02:00:000">
        <Text HAlign="center" VAlign="bottom" VPosition="20">Closed Caption Test Content 1</Text>
        <Text HAlign="center" VAlign="bottom" VPosition="10">Current Time 00:01:59</Text>
      </Subtitle>
  </Font>
</DCSubtitle>
```

TRANSMITTING DISPLAY INFORMATION BASED ON COMMUNICATION PROTOCOLS

TECHNICAL FIELD

The present disclosure relates to a communication device, a communication system, a control method for these and a program for causing a computer to execute this method. In detail, it relates to a communication device, a communication system, a control method for these and a program for causing a computer to execute this method, which transmit display information to a display device.

BACKGROUND ART

In the past, technology has been known in which display information such as character strings or images are displayed on a display device in synchronization with reproduction of content such as moving images. The displayed character strings are subtitles of a movie or the like. For example, in the case where there are a plurality of languages capable of being understood by viewers, or in the case where subtitles may only be necessary for some viewers, a system is proposed in which a server individually distributes display information to display devices worn by each of the viewers (for example, refer to Patent Literature 1). For example, in this system, the display information from a server is transmitted to a transmission apparatus connected to the server by a LAN (Local Area Network) cable or the like, and from this transmission apparatus, the display information is wirelessly transmitted to each of the display devices. Further, SMPTE (Society of Motion Picture and Television Engineers) or the like is used as a communication protocol which controls the distribution of display information. This SMPTE is a protocol based on a TCP (Transmission Control Protocol), and distribution of display information is started based on the SMPTE after a connection has been established in accordance with the TCP between the server and the transmission apparatus.

CITATION LIST

Patent Literature

Patent Literature 1: JP 2011-221236A

SUMMARY OF INVENTION

Technical Problem

However, in the case where a protocol for distribution control is used, such as SMPTE in the above described system, there will be cases where distribution of display information is interrupted. In the above described system, in the case where a failure in communication has occurred between the server and the transmission apparatus, while the server can detect the communication failure, the transmission apparatus is not able to detect the communication failure. This is because, in SMPTE, the transmission apparatus is not able to confirm a communication state, without the transmission apparatus being able to transmit a message which requests a response to the server. As a result of this, at the time of a failure occurring, in the case where the server has failed detection of the communication failure, or in the case where detection of the communication failure has been slow, there will be cases where the distribution of display information is cut off for a long time period.

The present disclosure is created by considering such a condition, and there is a need for providing a system which prevents interruption of the distribution of display information.

Solution to Problem

The present disclosure has been made in order to eliminate the above described problem, and a first aspect of this is a communication device which includes a message processing section which, in the case where a connection has been established with a server which distributes display information to be displayed on a display device in synchronization with reproduction of content, processes a message from the server for controlling the distribution in accordance with a first protocol, a connection confirmation section which confirms whether or not the connection has been established in accordance with a second protocol, and a connection request section which, in the case where the connection has not been established, requests establishment of the connection to the server in accordance with the second protocol. In this way, an effect is produced in which whether or not the connection has been established with the server is confirmed in accordance with the second protocol, and the establishment of the connection to the server is requested, in the case where the connection has not been established.

Further, in this first aspect, in the case where the control has not started within a fixed time period after the connection has been established by a start message which is the message specifying a start of the control, or in the case where the connection has not been established, the connection request section may request establishment of the connection in accordance with the second protocol to the server. In this way, an effect is produced in which the establishment of the connection to the server is requested, in the case where the start of the control has not been notified by a message within a fixed time period after the connection has been established, or in the case where the connection has not been established.

Further, in this first aspect, the connection confirmation section may confirm whether or not the connection has been established at fixed intervals. In this way, an effect is produced in which whether or not the connection has been established is confirmed at fixed intervals.

Further, in this first aspect, there may be further included a file acquisition section which acquires a file including the display information from a retaining location set in accordance with a retaining location setting request message which is the message requesting setting of the retaining location of the file, a file buffer which retains the acquired file in association with the content, and a transmission section which transmits the display information corresponding to the content specified by a content specification message which is the message specifying content to be reproduced from among display information within the retained file. In this way, an effect is produced in which display information is retained in association with content within a file acquired from the retaining location, and display information corresponding to content specified by a message is read and transmitted to the display device.

Further, in this first aspect, the file acquisition section may identify languages which use character strings included in the display information, and cause the file buffer to retain the file for each combination of the content and languages by identifying languages, and the transmission section may transmit the display information corresponding to the content specified from among the display information within the file based on the languages. In this way, an effect is produced in which the display information is transmitted based on the languages.

Further, in this first aspect, the display device may be a head-mounted display. In this way, an effect is produced in which the display information is transmitted to a head-mounted display.

Further, a second aspect of the present disclosure is a communication system which includes a server which distributes display information to be displayed on a display device in synchronization with reproduction of content, and a communication device including a message processing section which, in the case where a connection has been established with the server, processes messages from the server for controlling the distribution in accordance with a first protocol, a connection confirmation section which confirms whether or not the connection has been established in accordance with a second protocol, and a connection request section which, in the case where the connection has not been established, requests establishment of the connection to the server in accordance with the second protocol. In this way, an effect is produced in which whether or not the connection has been established with the server is confirmed in accordance with the second protocol, and the establishment of the connection to the server is requested, in the case where the connection has not been established.

Advantageous Effects of Invention

According to the present disclosure, an excellent effect can be achieved in which interruption of the distribution of display information can be prevented.

BRIEF DESCRIPTION OF DRAWINGS

FIG. 7 is a figure which shows a description example of a retaining location presentation file in the embodiments.

FIG. 9 is a figure which shows a description example of subtitle data in the embodiments.

FIG. 10 is a figure which shows an example of messages defined in an SMPTE protocol in the embodiments.

FIG. 21 is a flow chart which shows an example of a subtitle data reading process in the embodiments.

FIG. 22 is a figure which shows a description example of subtitle data in a modified example.

DESCRIPTION OF EMBODIMENTS

Hereinafter, the modes (hereinafter, called embodiments) for executing the present disclosure will be described. The description will be given in the following order.

1. The first embodiment (example in which connection confirmation is performed in accordance with a TCP/IP protocol).

2. A modified example

1. The Embodiments

Configuration Example of the Communication System

Figure 1:
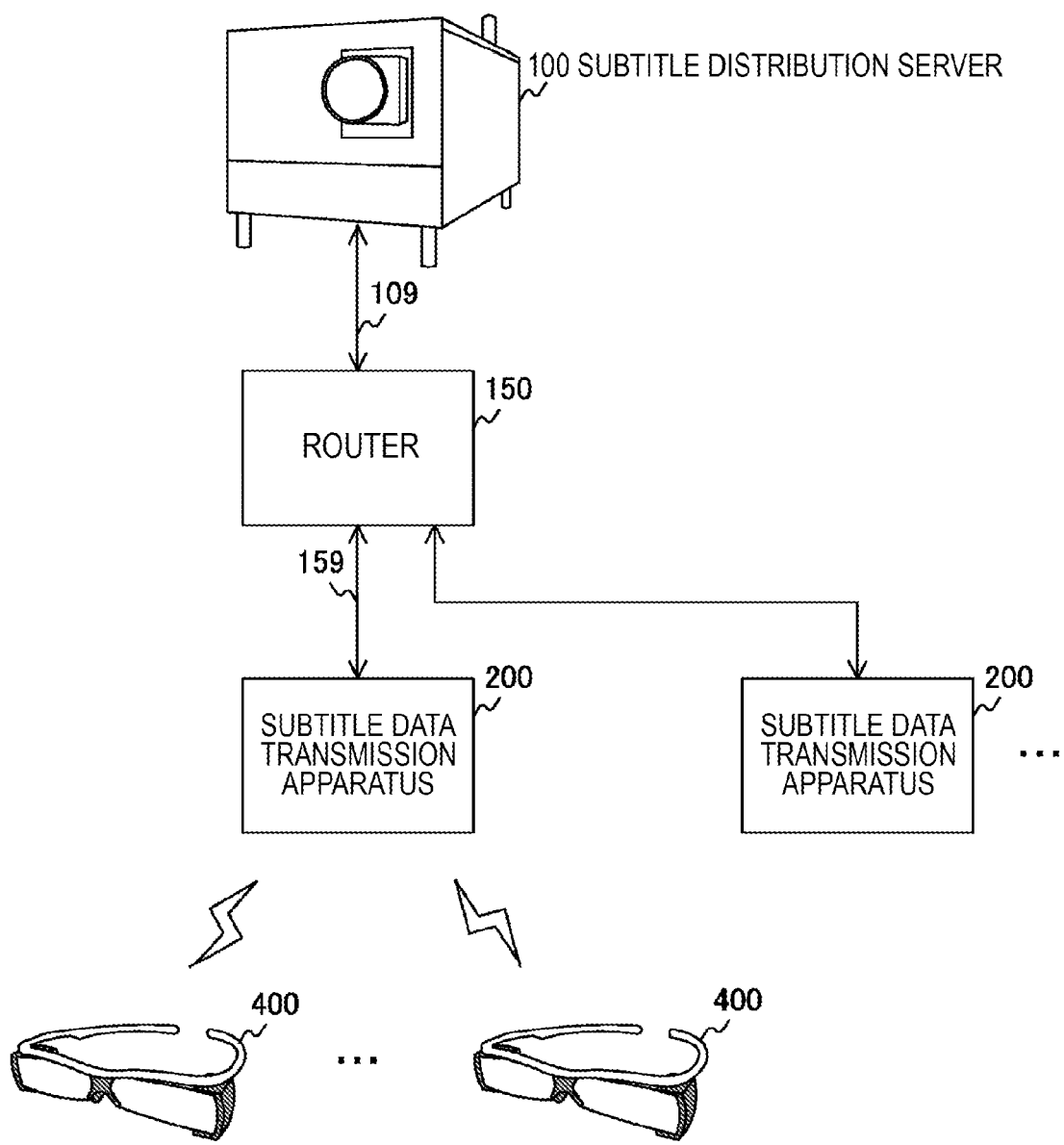
FIG. 1 is a figure which shows a configuration example of a subtitle distribution system in the embodiments.

FIG. 1 is a figure which shows a configuration example of a communication system in the embodiments. This communication system is a system for distributing, to each display device, display information to be displayed on the display devices in synchronization with reproduction of content. For example, the display information is subtitle data which includes subtitles of a movie. The communication system includes a subtitle distribution server 100, a router 150, one or more subtitle data transmission apparatuses 200, and one or more subtitle data display devices 400. Note that, the display information is not limited to subtitle data, if it is information to be displayed on the display devices. For example, the display information may include character strings or images other than subtitles.

The subtitle distribution server 100 distributes subtitle data to the display devices. This subtitle distribution server 100 transmits subtitle data to the subtitle data transmission apparatuses 200 via the router 150 or the like. For example, a TCP/IP and an SMPTE protocol are used in the communication between the subtitle distribution server 100 and the subtitle data transmission apparatuses 200. The subtitle distribution server 100 is handled as a DCS (Digital Cinema Server) in the SMPTE protocol. Note that, the subtitle distribution server 100 is an example of a server described in the range of the claims. Further, the SMPTE protocol is an example of the first protocol described in the range of the claims, and the TCP/IP is an example of the second protocol described in the range of the claims.

The router 150 mutually connects a network to which the subtitle distribution server 100 belongs and a network to which the subtitle data transmission apparatuses 200 belong.

The subtitle data transmission apparatuses 200 receive subtitle data distributed by the subtitle distribution server 100, and wirelessly transmit the received subtitle data to each of the subtitle data display devices 400. For example, each of the subtitle data transmission apparatuses 200 are installed at a fixed or greater interval (in every room or the like), and from the subtitle data transmission apparatuses 200, subtitle data is transmitted to each of the subtitle data display devices 400 within this communication range. The subtitle data transmission apparatuses 200 are handled as an ACS (Auxiliary Content Server) in the SMPTE protocol. Note that, the subtitle data transmission apparatuses 200 are examples of the communication device described in the range of the claims.

The subtitle data display devices 400 display subtitle data transmitted from the subtitle data transmission apparatuses 200. For example, a see-through type head-mounted display (HMD: Head Mounted Display) is used as this subtitle data display device 400.

[Configuration Example of the Subtitle Distribution Server]

Figure 2:
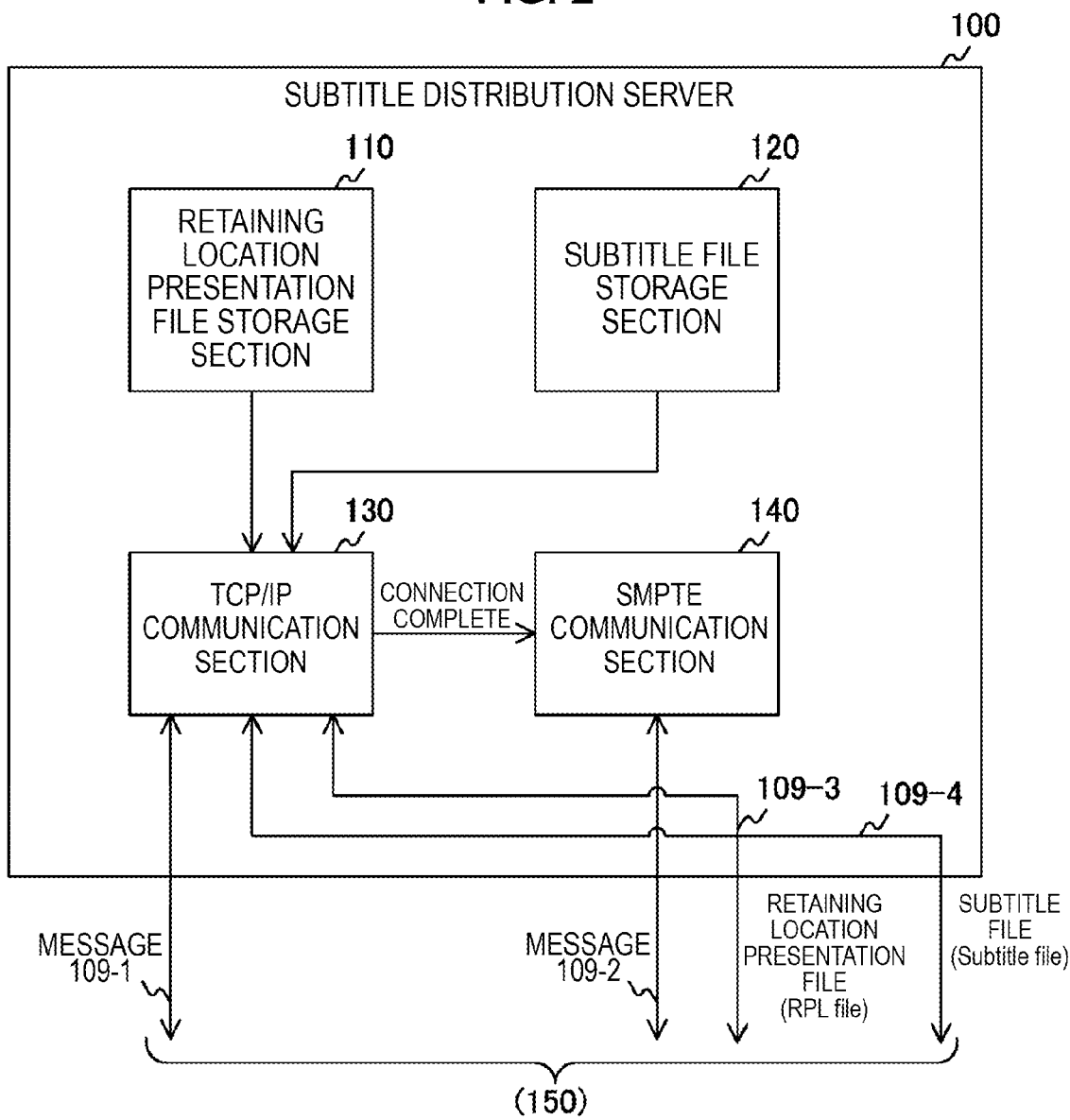
FIG. 2 is a block diagram which shows a configuration example of a subtitle distribution server in the embodiments.

FIG. 2 is a block diagram which shows a configuration example of the subtitle distribution server 100 in the embodiments. It includes a retaining location presentation file storage section 110, a subtitle file storage section 120, a TCP/IP communication section 130, and an SMPTE communication section 140.

The retaining location presentation file storage section 110 stores retaining location presentation files. Here, the retaining location presentation file retains content identification information for identifying content, and retaining locations of each of the one or more subtitle files related to this content. For example, the retaining location of a subtitle file is specified by a URL (Uniform Resource Locator). For example, the retaining location presentation file is an RPL (Resource Presentation List) file in SMPTE. Further, the subtitle file retains content identification information, language identification information for identifying languages, and one or more subtitle data relating to these languages and content. For example, the subtitle file is a Subtitle file in SMPTE. For example, the content identification information is a PlayoutID in SMPTE. The subtitle file storage section 120 stores the subtitle files.

The TCP/IP communication section 130 communicates with the subtitle data transmission apparatuses 200 in accordance with a TCP/IP. Specifically, the TCP/IP communication section 130 establishes a connection with the subtitle data transmission apparatuses 200, by transmitting and receiving messages in accordance with a TCP via a communication channel 109-1. Further, in the case where a message (for example, ping) has been received which requests a response for confirming the communication condition, the TCP/IP communication section 130 transmits a response message in accordance with an IP. In addition, the TCP/IP communication section 130 distributes retaining location presentation files and subtitle files to the subtitle data transmission apparatuses 200, by transmitting and receiving messages in accordance with an IP via communication channels 109-3 and 109-4.

In the case where a connection has been established by a TCP, the SMPTE communication section 140 communicates with the subtitle data transmission apparatuses 200 via the communication channel 109-2, in accordance with an SMPTE protocol. The details of the communication procedure by an SMPTE protocol will be described later.

Note that, while it is assumed to be a configuration in which the retaining location presentation file storage section 110 and the subtitle file storage section 120 are included in the subtitle distribution server 100, it may be a configuration in which these are included outside of the subtitle distribution server 100, if there is a retaining location managed by the subtitle distribution server 100.

[Configuration Example of the Subtitle Data Transmission Apparatus]

Figure 3:
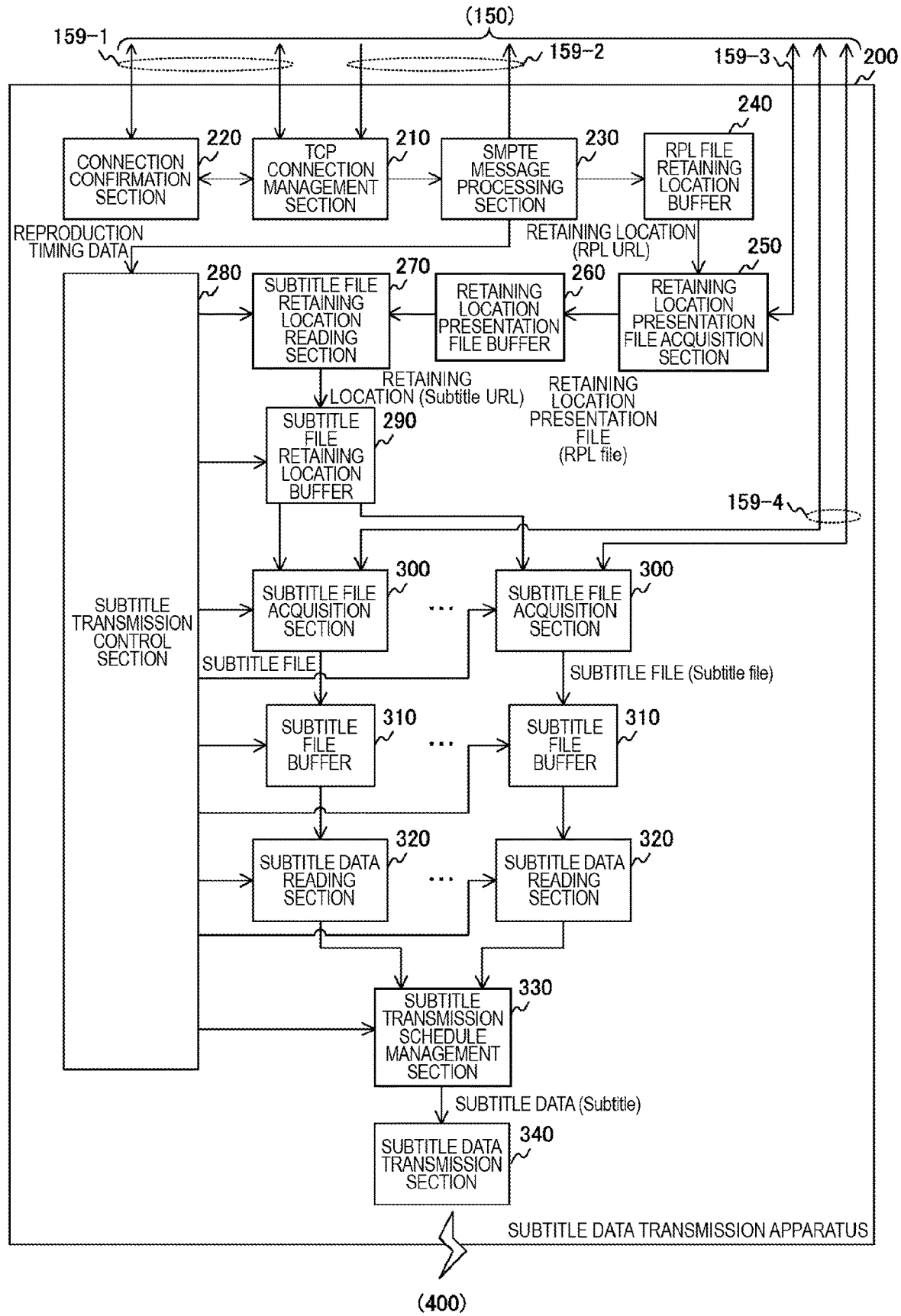
FIG. 3 is a block diagram which shows a configuration example of a subtitle data transmission apparatus in the embodiments.

FIG. 3 is a block diagram which shows a configuration example of the subtitle data transmission apparatus 200 in the embodiments. The subtitle data transmission apparatus 200 includes a TCP connection management section 210, a connection confirmation section 220, an SMPTE message processing section 230, and an RPL file retaining location buffer 240. Further, the subtitle data transmission apparatus 200 includes a retaining location presentation file acquisition section 250, a retaining location presentation file buffer 260, a subtitle file retaining location reading section 270, a subtitle transmission control section 280, and a subtitle file retaining location buffer 290. In addition, the subtitle data transmission apparatus 200 includes a subtitle file acquisition section 300, a subtitle file buffer 310 and a subtitle data reading section 320 for each language, and includes a subtitle transmission schedule management section 330 and a subtitle data transmission section 340. For example, in the case where the subtitle data transmission apparatus 200 transmits subtitle data of 6 languages, a group of the subtitle file acquisition section 300, the subtitle file buffer 310 and the subtitle data reading section 320 will be set up for 6 groups.

The TCP connection management section 210 performs establishment and disconnection of a connection with the subtitle distribution server 100 by transmitting and receiving messages in accordance with a TCP via a communication channel 159-1. In the case of a connection being established, this TCP connection management section 210 notifies connection completion to the connection confirmation section 220. Here, the communication channel 159-1 corresponds to the communication channel 109-1 in FIG. 2. For example, in the establishment of a connection, a three-way handshake, which transmits and receives SYN, SYN/ACK and ACK messages, is used by the execution of a socket command. For example, in the disconnection of a connection, FIN and ACK messages are transmitted and received.

Further, in the case where a connection has been established, and an SMPTE message has been received via a communication channel 159-2, the TCP connection management section 210 causes the SMPTE message processing section 230 to process this message. Here, the communication channel 159-2 corresponds to the communication channel 109-2 in FIG. 2.

In addition, in the case where a message for starting distribution control has not been received, within a fixed time period from a connection being established, or the connection confirmation section 220 has detected disconnection of a connection, the TCP connection management section 210 executes a reconnection of a connection. For example, a message for starting distribution control is an announcement message in SMPTE.

Note that, the TCP connection management section 210 is an example of the connection request section in the range of the claims.

The connection confirmation section 220 judges whether or not a connection has been established with the subtitle distribution server 100 by transmitting and receiving messages in accordance with an IP via the communication channel 159-1. Specifically, after the TCP connection management section 210 has established a connection, the connection confirmation section 220 transmits a ping message or the like to the subtitle distribution server 100. Then, the connection confirmation section 220 judges that a connection has not been established (in order words, detects a disconnection of a connection) in the case where a response message has not been received within a fixed time period after the ping message has been transmitted. In the case where disconnection of a connection has been detected, the connection confirmation section 220 outputs a reconnection request, which requests reconnection of a connection, to the TCP connection management section 210. Note that, the connection confirmation section 220 may confirm a connection by transmitting a message other than a ping message in accordance with a TCP/IP, if it is a message which requests a response to the subtitle distribution server 100.

The SMPTE message processing section 230 processes messages from the subtitle distribution server 100, in accordance with an SMPTE protocol. Specifically, the SMPTE message processing section 230 transmits a response message for a received message to the subtitle distribution server 100 via the communication channel 159-2. Further, in the case where an RPL retaining location setting request message, which includes a retaining location of a retaining location presentation file and content identification information to be reproduced, is received, the SMPTE message processing section 230 causes the RPL file retaining location buffer 240 to retain this retaining location. For example, the retaining location of the retaining location presentation file is specified by a URL.

Further, the SMPTE message processing section 230 extracts the present position of a timeline and a specification of the start or end of reproduction from a timeline update request message and an output mode setting request message. Here, the timeline update request message is a message which requests an update of the present position in the timeline managed by the server. The output mode setting request message is a message specified by content identification information, and the start or end of reproduction of subtitles related to this content by enabling or disabling of the output mode. The SMPTE message processing section 230 supplies the specification of the start or end, the content identification information, and the timing of the present position, to the subtitle transmission control section 280 as reproduction timing data.

The RPL file retaining location buffer 240 retains a retaining location (RPL URL) of the retaining location presentation file. For example, the RPL file retaining location buffer 240 uses a queue control system as a management system.

The retaining location presentation file acquisition section 250 acquires a retaining location presentation file from the retaining location (RPL URL) of the retaining location presentation file. For example, this retaining location presentation file acquisition section 250 downloads a retaining location presentation file, by specifying a retaining location, and transmitting a message which requests transmission of the retaining location presentation file to the subtitle distribution server 100 in accordance with an IP. The retaining location presentation file acquisition section 250 causes the retaining location presentation file buffer 260 to retain the acquired retaining location presentation file.

The retaining location presentation file buffer 260 retains the retaining location presentation file. For example, this retaining location presentation file buffer 260 uses a queue control system as a management system.

The subtitle transmission control section 280 controls the subtitle file retaining location reading section 270 or the like, based on the reproduction timing data. Apart from the subtitle file retaining location reading section 270, the subtitle file retaining location buffer 290, the subtitle file acquisition section 300, the subtitle file buffer 310, the subtitle data reading section 320 and the subtitle transmission schedule management section 330 are also controlled. Specifically, the subtitle transmission control section 280 notifies the content identification information specified by the start of reproduction, and the present position in the timeline, to the subtitle file retaining location reading section 270 or the like. Further, the subtitle transmission control section 280 erases the subtitle file retaining location, the subtitle file and the subtitle data related to the content specified by the end of reproduction from the buffer (290, 310 and 330).

The subtitle file retaining location reading section 270 reads the retaining location presentation file related to the content to be reproduced, in accordance with a control of the subtitle transmission control section 280, and reads the retaining location (Subtitle URL) of the subtitle file described in this subtitle location specification file. The subtitle file retaining location reading section 270 erases the read retaining location presentation file in the retaining location presentation file buffer 260. Then, the subtitle file retaining location reading section 270 judges whether or not the reproduction of content has finished, from the present position in the timeline received from the subtitle transmission control section 280, and the reproduction time period of the description in the retaining location presentation file. The subtitle file retaining location reading section 270 causes the subtitle file retaining location buffer 290 to perform retention for the retaining location presentation file of the content prior to reproduction or during reproduction. On the other hand, the subtitle file retaining location reading section 270 performs only erasing, without causing retention in the subtitle file retaining location buffer 290, for the retaining location presentation file of content which has completed reproduction.

The subtitle file retaining location buffer 290 retains the retaining location (Subtitle URL) of the subtitle file associated with the content identification information (PlayoutID). For example, this subtitle file retaining location buffer 290 uses a queue control system as a management system.

The subtitle file acquisition section 300 acquires subtitle files corresponding to content to be reproduced and prescribed languages, in accordance with a control of the subtitle transmission control section 280. For example, language identification information of different languages is set for each of the subtitle file acquisition sections 300. Further, each of the subtitle file buffers 310 and each of the subtitle file acquisition sections 300 have a one-to-one association. The subtitle file acquisition section 300 receives content identification information from the subtitle transmission control section 280, and reads retaining locations (Subtitle URLs) of the subtitle files, in which this content identification information and the set language identification information match, from the subtitle file retaining location buffer 290. Then, the subtitle file acquisition section 300 acquires the subtitle files from these retaining locations. The subtitle file acquisition section 300 erases the read retaining locations of the subtitle files from the subtitle file retaining location buffer 290.

Then, the subtitle file acquisition section 300 judges whether or not the reproduction of subtitles has finished from the present position in the timeline received from the subtitle transmission control section 280, and the reproduction time period of subtitles of the description in the subtitle files. The subtitle file acquisition section 300 causes the corresponding subtitle file buffers 310 to perform retention for the subtitle files of subtitles prior to reproduction or during reproduction. On the other hand, the subtitle file acquisition section 300 performs only erasure, without causing retention in the subtitle file buffers 310, for the subtitle files of content which has finished reproduction. Note that, the subtitle file acquisition section 300 is an example of the file acquisition section described in the range of the claims. Further, the subtitle file acquisition section 300 may perform only erasure in the case where it is judged that the transmission has not been performed in time based on the present position, even if it is a subtitle file prior to reproduction or during reproduction.

The subtitle file buffer 310 retains the subtitle files (Subtitle files) acquired by the corresponding subtitle file acquisition sections 300, in accordance with a control of the subtitle transmission control section 280. For example, this subtitle file buffer 310 uses a queue control system as a management system. Note that, the subtitle file buffer 310 is an example of the file buffer described in the range of the claims.

The subtitle data reading section 320 reads a subtitle file related to content to be reproduced from the subtitle file buffer 310, in accordance with a control of the subtitle transmission control section 280, and sequentially reads subtitle data from this subtitle file. Further, the subtitle data reading section 320 erases the read subtitle file from the subtitle file buffer 310.

Then, the subtitle data reading section 320 judges whether or not the reproduction of subtitles has finished from the present position in the timeline received from the subtitle transmission control section 280, and the reproduction time period of the description in the subtitle data. The subtitle file acquisition section 300 performs supply to the subtitle transmission schedule management section 330 for the subtitle data prior to reproduction or during reproduction. On the other hand, the subtitle data reading section 320 performs only erasure, without supplying to the subtitle transmission schedule management section 330, for the subtitle data which has finished reproduction. Note that, the subtitle data reading section 320 may perform only erasure in the case where it is judged that the transmission has not been performed in time based on the present position, even if it is subtitle data prior to reproduction or during reproduction.

The subtitle transmission schedule management section 330 determines a transmission schedule of each subtitle data related to content to be reproduced, in accordance with a control of the subtitle transmission control section 280. This subtitle transmission schedule management section 330 determines the transmission order of subtitle data based on the transmission frequency of each subtitle data, and the languages. For example, in the case where English subtitle data #1 and Japanese subtitle data #2 are both transmitted two times, they will be transmitted in the order of the subtitle data #1, the subtitle data #2, the subtitle data #1 and the subtitle data #2. Or, they will be transmitted in the order of the subtitle data #1, the subtitle data #1, the subtitle data #2 and the subtitle data #2. The subtitle transmission schedule management section 330 supplies the subtitle data to the subtitle data transmission section 340, in the order of the transmission order.

The subtitle data transmission section 340 wirelessly transmits subtitle data to each of the subtitle data display devices 400 within a communication range. The subtitle transmission schedule management section 330 and the subtitle data transmission section 340 are examples of the transmission section described in the range of the claims.

Figure 4:
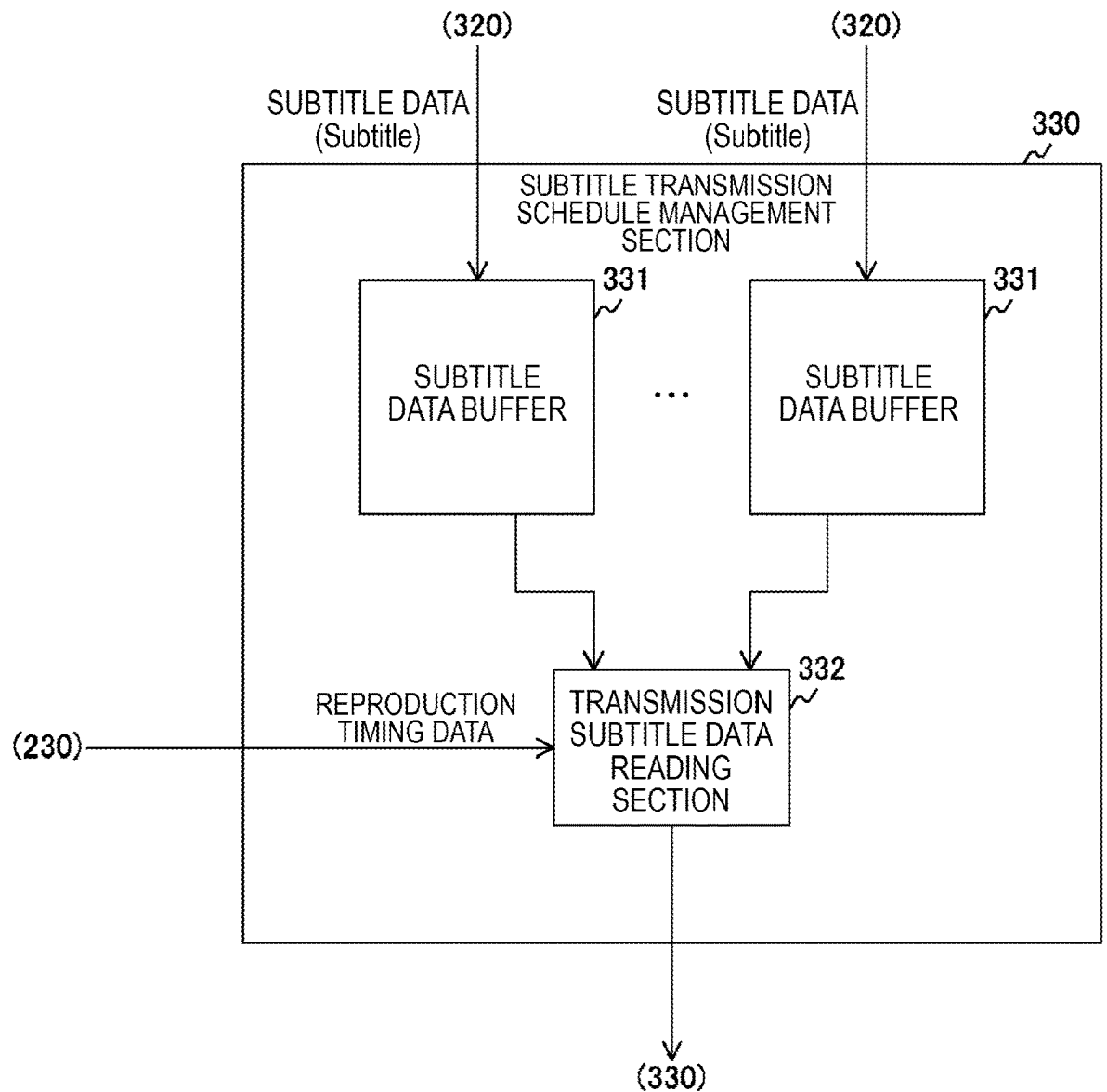
FIG. 4 is a block diagram which shows a configuration example of a subtitle transmission schedule management section in the embodiments.

FIG. 4 is a block diagram which shows a configuration example of the subtitle transmission schedule management section 330. This subtitle transmission schedule management section 330 includes subtitle data buffers 331 corresponding to each of the subtitle data reading sections 320, and a transmission subtitle data reading section 332.

The subtitle data buffer 331 retains the subtitle data from the corresponding subtitle data reading sections 320. For example, this subtitle data buffer 331 uses a queue control system as a management system.

The transmission subtitle data reading section 332 determines a transmission schedule of the subtitle data in accordance with a control of the subtitle transmission control section 280, and reads the subtitle data based on this transmission schedule from the subtitle data buffer 331. The transmission subtitle data reading section 332 erases the read subtitle data from the subtitle data buffer 331. Further, the transmission subtitle data reading section 332 judges whether or not reproduction of subtitles has finished from the present position in the timeline received from the subtitle transmission control section 280, and the reproduction time period of the subtitles of the description in the subtitle data. The transmission subtitle data reading section 332 performs supply to the subtitle data transmission section 340 for the subtitle data prior to reproduction or during production. On the other hand, the transmission subtitle data reading section 332 performs only erasure, without supplying to the subtitle data transmission section 340, for the subtitle data which has finished reproduction.

[Configuration Example of the Subtitle Data Display Devices]

Figure 5:
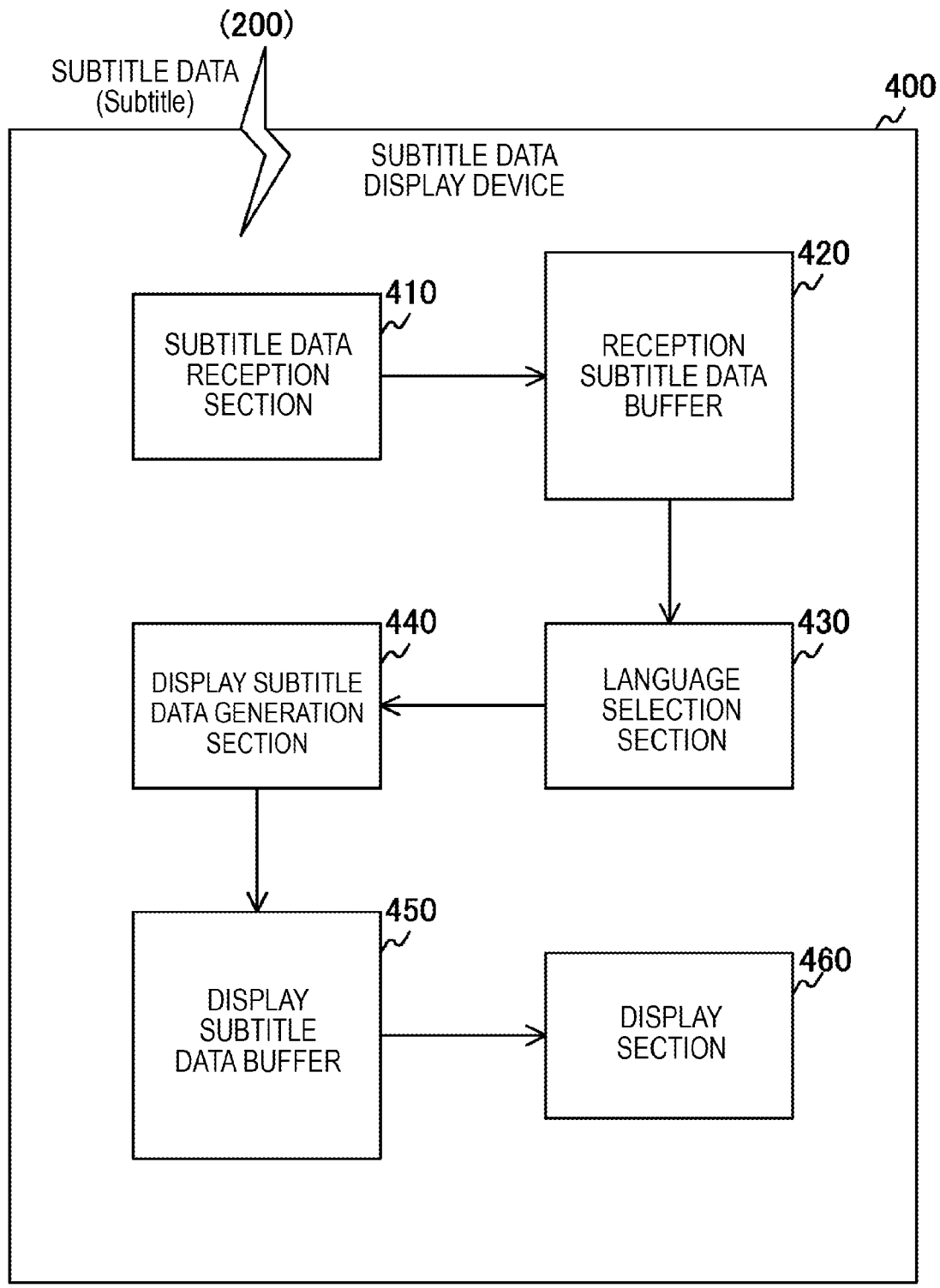
FIG. 5 is a block diagram which shows a configuration example of a subtitle data display device in the embodiments.

FIG. 5 is a block diagram which shows a configuration example of the subtitle data display device 400 in the embodiments. The subtitle data display device 400 includes a subtitle data reception section 410, a reception subtitle data buffer 420, a language selection section 430, a display subtitle data generation section 440, a display subtitle data buffer 450, and a display section 460.

The subtitle data reception section 410 receives subtitle data wirelessly transmitted from the subtitle data transmission apparatus 200. The subtitle data reception section 410 causes the reception subtitle data buffer 420 to retain the received subtitle data.

The reception subtitle data buffer 420 retains the received subtitle data. For example, this reception subtitle data buffer 420 uses a queue control system as a management system.

The language selection section 430 selects subtitle data corresponding to a language to be displayed on the display section 460 from among the subtitle data within the reception subtitle data buffer 420. The language to be displayed on the display section 460 is changed by a switch operation or the like of a user. The language selection section 430 supplies the selected subtitle data to the display subtitle data generation section 440.

The display subtitle data generation section 440 generates data for displaying on the display section 460 as display subtitle data, based on the supplied subtitle data. For example, the display subtitle data is generated based on fonts or character strings described in the subtitle data, the display position, the specification of the display section 460 or the like. The display subtitle data generation section 440 causes the display subtitle data buffer 450 to retain the generated display subtitle data.

The display subtitle data buffer 450 retains the generated display subtitle data. For example, this display subtitle data buffer 450 uses a queue control system as a management system.

The display section 460 reads and displays the display subtitle data from the display subtitle data buffer 450.

Figure 6:
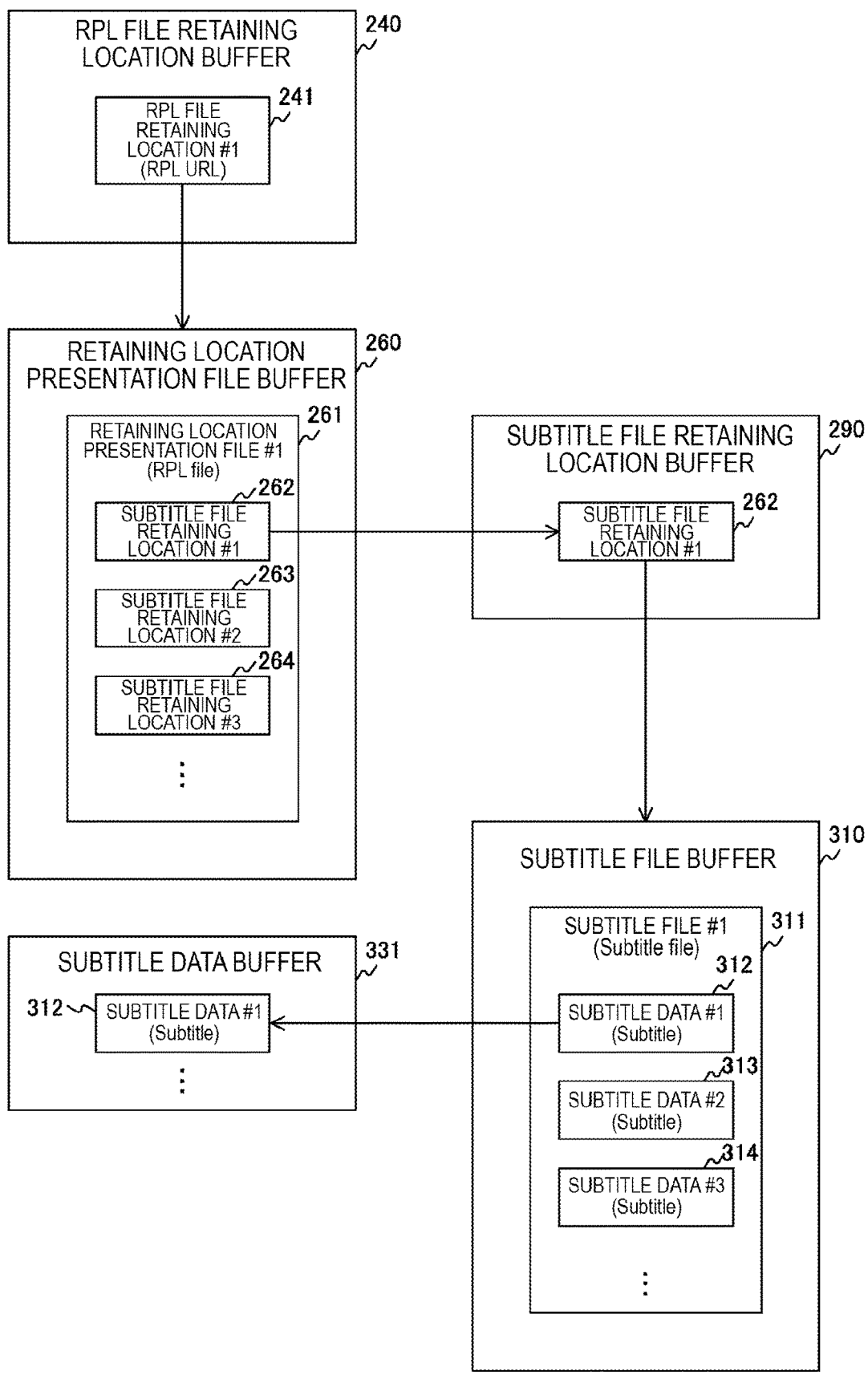
FIG. 6 is a figure for describing the flow of subtitle data in the embodiments.

FIG. 6 is a figure for describing the flow of subtitle data in the embodiments. First, when a retaining location (RPL URL) of a retaining location presentation file is notified by an RPL retaining location setting request message from the subtitle distribution server 100, this retaining location is retained in the RPL file retaining location buffer 240.

The retaining location presentation file (RPL file) 261 acquired from the retaining location of the retained retaining location presentation file is retained in the retaining location presentation file buffer 260. Content identification information, and subtitle file retaining locations (Subtitle URLs) 262, 263 and 264 related to this content identification information, are disclosed in the retaining location presentation file 261. Further, language identification information associated with each of the subtitle file retaining locations is disclosed in the retaining location presentation file 261.

The subtitle file retaining location 262 or the like acquired for each language from the retained retaining location presentation file is retained in the subtitle file retaining location buffer 290.

The subtitle file (Subtitle file) 311 acquired from the retained subtitle file retaining location is retained in the subtitle file buffer 310. The subtitle data 312, 313, 314 or the like corresponding to the content and languages are described along with each reproduction time period in this subtitle file.

The subtitle data (Subtitle) read from the retained subtitle file is retained in the subtitle data buffer 331. The retained subtitle data is transmitted in accordance with a transmission schedule.

As illustrated in FIG. 6, by retaining the retaining location (URL) in the buffer (240 or 290), the file will be surely downloaded from this retaining location. Further, by retaining the file in the buffer (260 or 310), the data described in this file will be surely read. In addition, by retaining the subtitle data in the subtitle data buffer 331, the subtitle data will be surely transmitted, in accordance with a transmission schedule.

FIG. 7 is a figure which shows a description example of a retaining location presentation file. As shown in FIG. 7, for example, a subtitle file retaining location 262 or the like is described along with languages and a reproduction time period, by an XML (Extensible Markup Language), in the retaining location presentation file. Specifically, the retaining location 262 or the like is described as an element of a "Resource file" tag.

Figure 8:
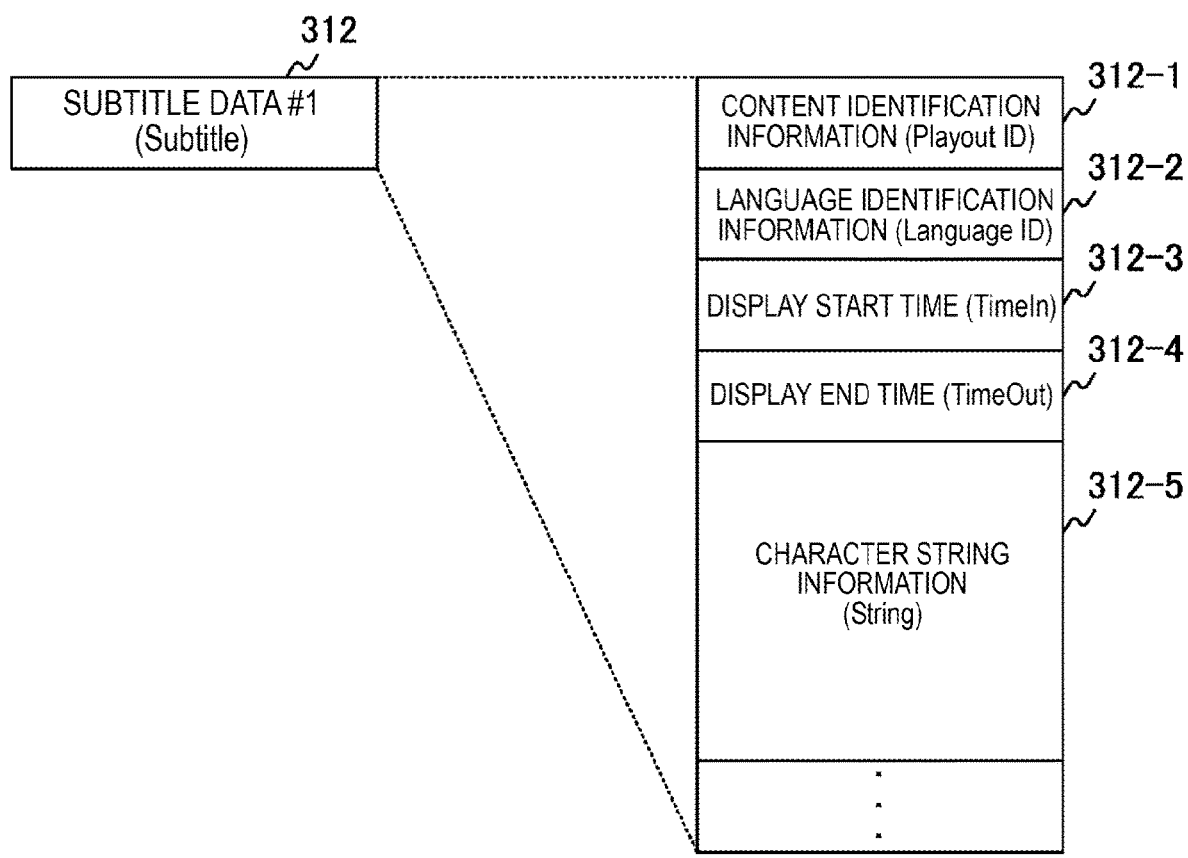
FIG. 8 is a figure which shows a configuration example of subtitle data in the embodiments.

FIG. 8 is a figure which shows a configuration example of the subtitle data in the embodiments. This subtitle data includes content identification information (PlayoutID), language identification information (LanguageID), a display start time (TimeIn), a display end time (TimeOut), character string information (String) or the like.

The display start time and the display end time show the times of the start and end of the display of subtitle data. The character string information is data of a character string displayed as subtitles.

FIG. 9 is a figure which shows a description example of subtitle data. As shown in FIG. 9, for example, content identification information 312-1, language identification information 312-2, a display start time 312-3, a display end time 312-4, and character string information 312-5 are described in this subtitle data. Specifically, the content identification information 312-1 is described as an element of an "Id" tag, and the language identification information 312-2 is described as an element of a "Language" tag. Further, the display start time 312-3 is described as a "TimeIn" attribute and the display end time 312-4 is described as a "TimeOut" attribute in the "Subtitle" tag. Also, the character string information 312-5 is described as an element of a "Text" tag.

FIG. 10 is a figure which shows an example of messages defined in an SMPTE protocol in the embodiments. Messages such as an announcement, a new lease acquisition request, a status acquisition request, an RPL retaining location setting request, an output mode setting request, a timeline update request and a lease end request are defined in the SMPTE protocol.

The announcement message is a message transmitted in order for a DCS (the subtitle distribution server 100 or the like) to confirm that a device of a reception side (the subtitle data transmission apparatus 200 or the like) can interpret an SMPTE protocol. Control of distribution is started by transmission and reception of this message. Note that, an announcement message is an example of the start message described in the range of the claims.

The new lease acquisition request message is a message transmitted in order to set a lease period of a communication channel.

The status acquisition request message is a message transmitted in order for a DCS to acquire the present status of an ACS (the subtitle data transmission apparatus 200 or the like).

The RPL retaining location setting request message is a message in which the DCS presents the retaining location of the retaining location presentation file to the ACS. Note that, the RPL retaining location setting request message is an example of the retaining location setting request message described in the range of the claims.

The output mode setting request message is a message in which the DCS specifies whether or not an output of a resource (subtitles or the like) is enabled to the ACS. Content identification information (Playout ID) and the state of the output mode are described in the output mode setting request message. In the case where enabled has been set for this output mode, reproduction of subtitle data related to this content identification information is started. Note that, the output mode setting request message is an example of the content specification message described in the range of the claims.

The timeline update request message is a message in which the DCS presents the present position in the timeline to the ACS.

The lease end message is a message in which the DCS specifies the end of the lease of the communication channel, and the discarding of all data related to the present lease.

[Operation Example of the Communication System]

Figure 11:
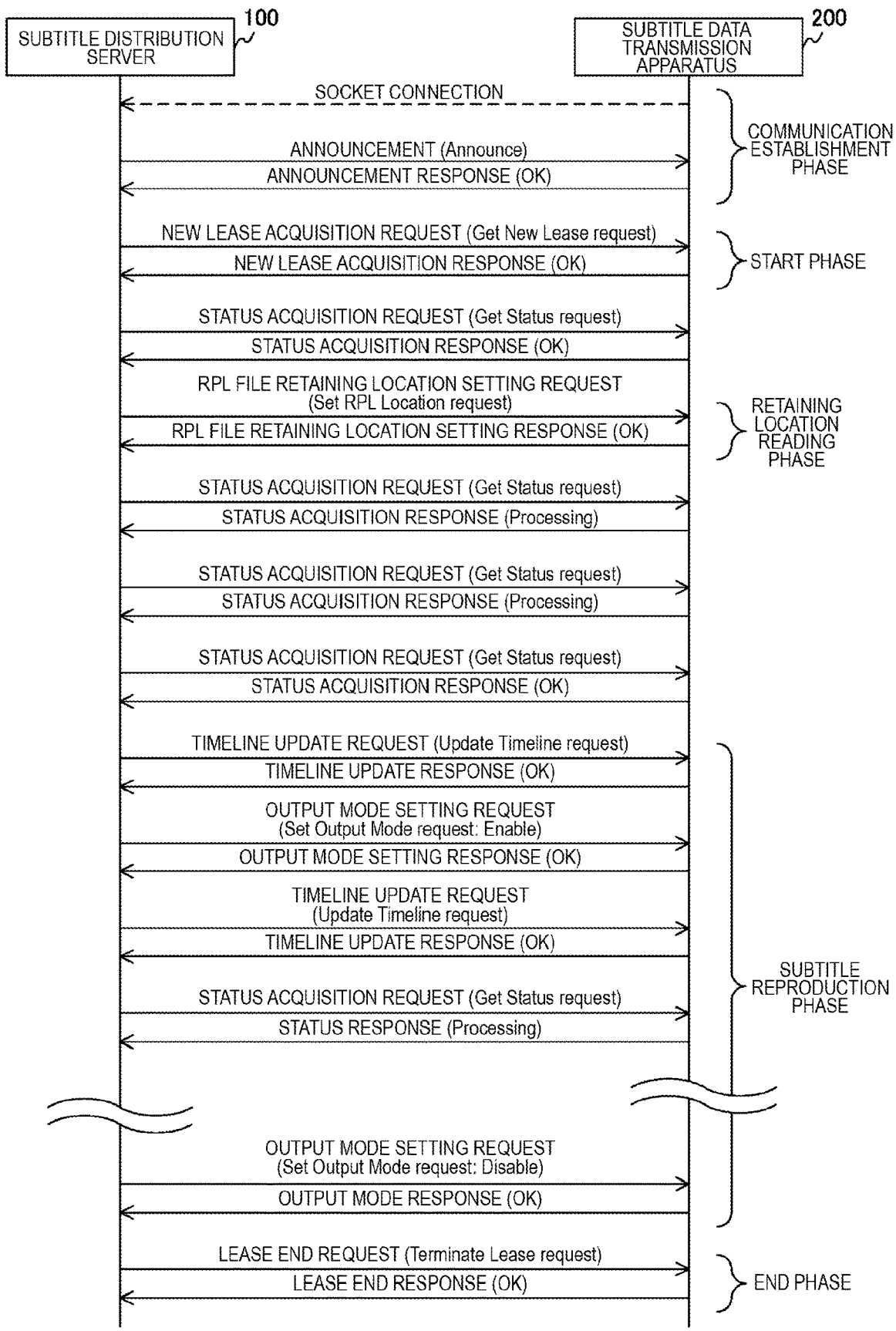
FIG. 11 is a sequence diagram which shows an example of distribution control of subtitle data in the embodiments.

FIG. 11 is a sequence diagram which shows an example of distribution control of subtitle data in the embodiments. First, a communication establishment phase which establishes communication in an SMPTE protocol is started. When a connection with the subtitle distribution server 100 is completed by executing a socket command by the subtitle data transmission apparatus 200, the subtitle distribution server 100 transmits an announcement message to the subtitle data transmission apparatus 200. When a response message in which OK is described is received back, the communication establishment phase ends.

After the communication establishment phase ends, a start phase which starts a lease of a communication channel is started. The subtitle distribution server 100 transmits a new lease acquisition request to the subtitle data transmission apparatus 200. When a response message in which OK is described is received back, the start phase ends.

After the start phase ends, the subtitle distribution server 100 transmits a status acquisition request to the subtitle data transmission apparatus 200. When a response message in which OK is described is received back, a retaining location reading phase for reading the retaining location of the retaining location presentation file is started.

In the retaining location reading phase, the subtitle distribution server 100 transmits an RPL file retaining location setting request to the subtitle data transmission apparatus 200. When a response message in which OK is described is received back, the retaining location reading phase ends.

After the retaining location reading phase ends, the subtitle distribution server 100 transmits a status acquisition request to the subtitle data transmission apparatus 200. When a response message in which OK is described is received back, a subtitle reproduction phase for causing the subtitle data display device 400 to reproduce retention is started. On the other hand, when a message in which Processing is described is received back, the subtitle reproduction phase is not started.

In the subtitle reproduction phase, the subtitle distribution server 100 transmits a timeline update request to the subtitle data transmission apparatus 200. When a response message in which OK is described is received back, the subtitle distribution server 100 next transmits an output mode setting request, in which enable (Enable) is described, to the subtitle data transmission apparatus 200. When a response message in which OK is described is received back, the subtitle distribution server 100 transmits the timeline update request or the status acquisition request as necessary (for example, at fixed intervals) to the subtitle data transmission apparatus 200. Then, in the case where reproduction of subtitles is caused to end, the subtitle distribution server 100 transmits an output mode setting request, in which disable (Disable) is described, to the subtitle data transmission apparatus 200. When a response message in which OK is described is received back, the subtitle reproduction phase ends.

After the subtitle reproduction phase ends, an end phase which ends the lease of the communication channel is started. In the end phase, the subtitle distribution server 100 transmits a lease end request to the subtitle data transmission apparatus 200. When a response message in which OK is described is received back, the end phase ends.

[Operation Example of the Subtitle Distribution Server]

Figure 12:
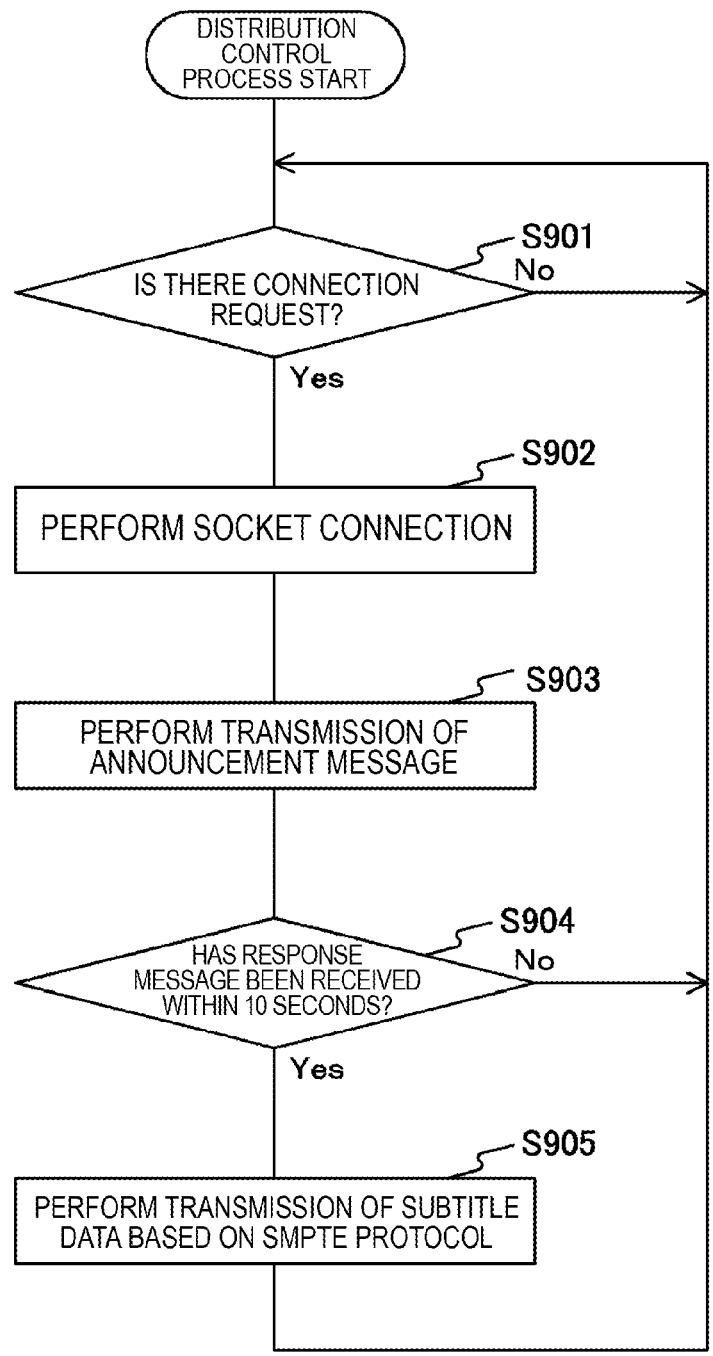
FIG. 12 is a flow chart which shows an example of a distribution control process in the embodiments.

FIG. 12 is a flow chart which shows an example of a distribution control process which is executed by the subtitle distribution server 100 in the embodiments. For example, this distribution control process is started at the time when a power source to the subtitle distribution server 100 is turned on, and a program for controlling the distribution of subtitles is executed.

The subtitle distribution server 100 judges whether or not there is a request of the establishment of a connection (that is, a connection) from the subtitle data transmission apparatus 200 (step S901). In the case where there is a request of a connection (step S901: Yes), the subtitle distribution server 100 performs a socket connection in accordance with a TCP, and establishes a connection (step S902).

The subtitle distribution server 100 transmits an announcement message, in accordance with an SMPTE protocol (step S903).

Then, the subtitle distribution server 100 judges whether or not a response message corresponding to the announcement has been received, within a prescribed time period (for example, 10 seconds) after transmitting the announcement message (step S904). In the case where a response message corresponding to the announcement has been received within a prescribed time period (step S904: Yes), the subtitle distribution server 100 starts transmission of subtitle data, based on the SMPTE protocol (step S905).

In the case where there is no request of a connection (step S901: No), in the case where a response message has not been received within a prescribed time period (step S904: No), or after step S905, the subtitle distribution server 100 returns to step S901.

Figure 13:
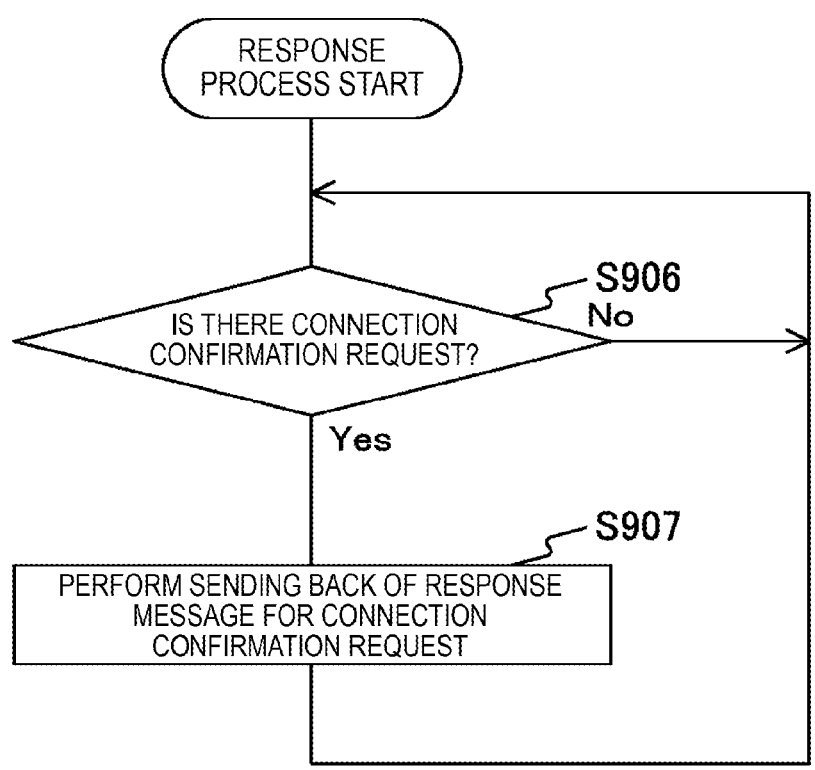
FIG. 13 is a flow chart which shows an example of a response process in the embodiments.

FIG. 13 is a flow chart which shows an example of a response process executed by the subtitle distribution server 100 in the embodiments. For example, this response process is started at the time when a power source to the subtitle distribution server 100 is turned on, and a program for controlling communication with the subtitle data transmission apparatus 200 is executed. The subtitle distribution server 100 judges whether or not there is a request of connection confirmation (for example, ping) from the subtitle data transmission apparatus 200 (step S906).

In the case where there is a request of connection confirmation (step S906: Yes), the subtitle distribution server 100 sends back a response message, in accordance with an IP (step S907). In the case where there is no request of connection confirmation (step S906: No), or after step S907, the subtitle distribution server 100 returns to step S906.

[Operation example of the subtitle data transmission apparatus]

Figure 14:
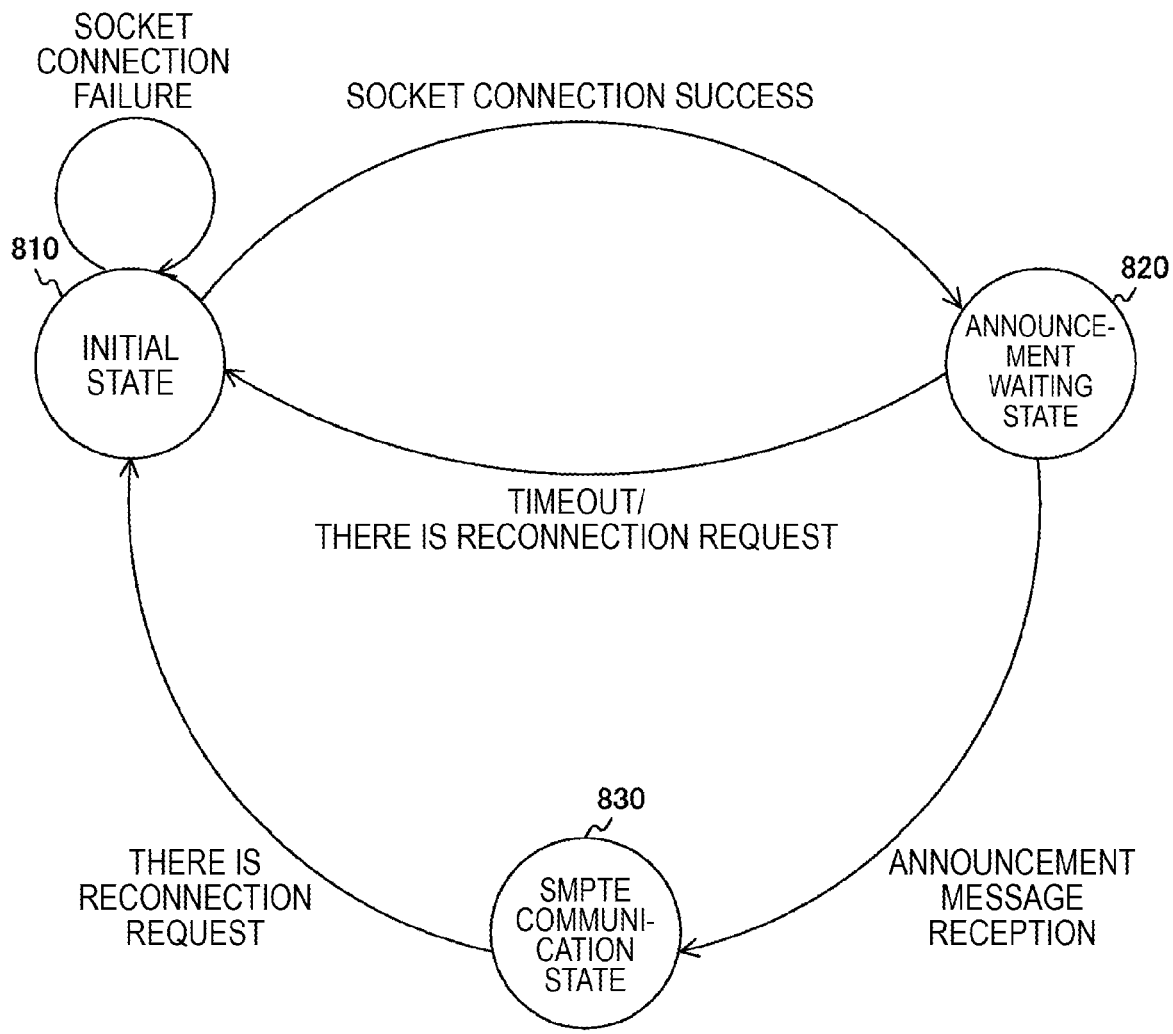
FIG. 14 is a state transition figure for describing a transition of the states of a TCP connection management section in the embodiments.

FIG. 14 is a state transition figure for describing a transition of the states of the TCP connection management section 210 in the embodiments. The states of the TCP connection management section 210 include an initial state 810, an announcement waiting state 820, and an SMPTE communication state 830. In the case where the transmission process of subtitle data is started, the TCP connection management section 210 transitions to the initial state 810.

The TCP connection management section 210 in the initial state 810 attempts the establishment of a connection (that is, a socket connection). In the case of succeeding a socket connection, the TCP connection management section 210 transitions to the announcement waiting state 820. On the other hand, in the case of failing a socket connection, the TCP connection management section 210 maintains the initial state 810.

In the announcement waiting state 820, the TCP connection management section 210 judges whether or not an announcement message has been received within a fixed time period from the socket connection success. Not receiving an announcement message within a fixed time period will hereinafter be called a "timeout" of the announcement. In the case where a timeout has occurred, or in the case where reconnection of a socket has been requested by the connection confirmation section 220, the TCP connection management section 210 transitions to the initial state 810. On the other hand, in the case where an announcement message has been received within a fixed time period, the TCP connection management section 210 transitions to the SMPTE communication state 830.

In the SMPTE communication state 830, the TCP connection management section 210 causes the SMPTE message processing section 230 to process messages in an SMPTE protocol. Further, in the case where reconnection of a socket has been requested by the connection confirmation section 220, the TCP connection management section 210 transitions to the initial state 810.

Figure 15:
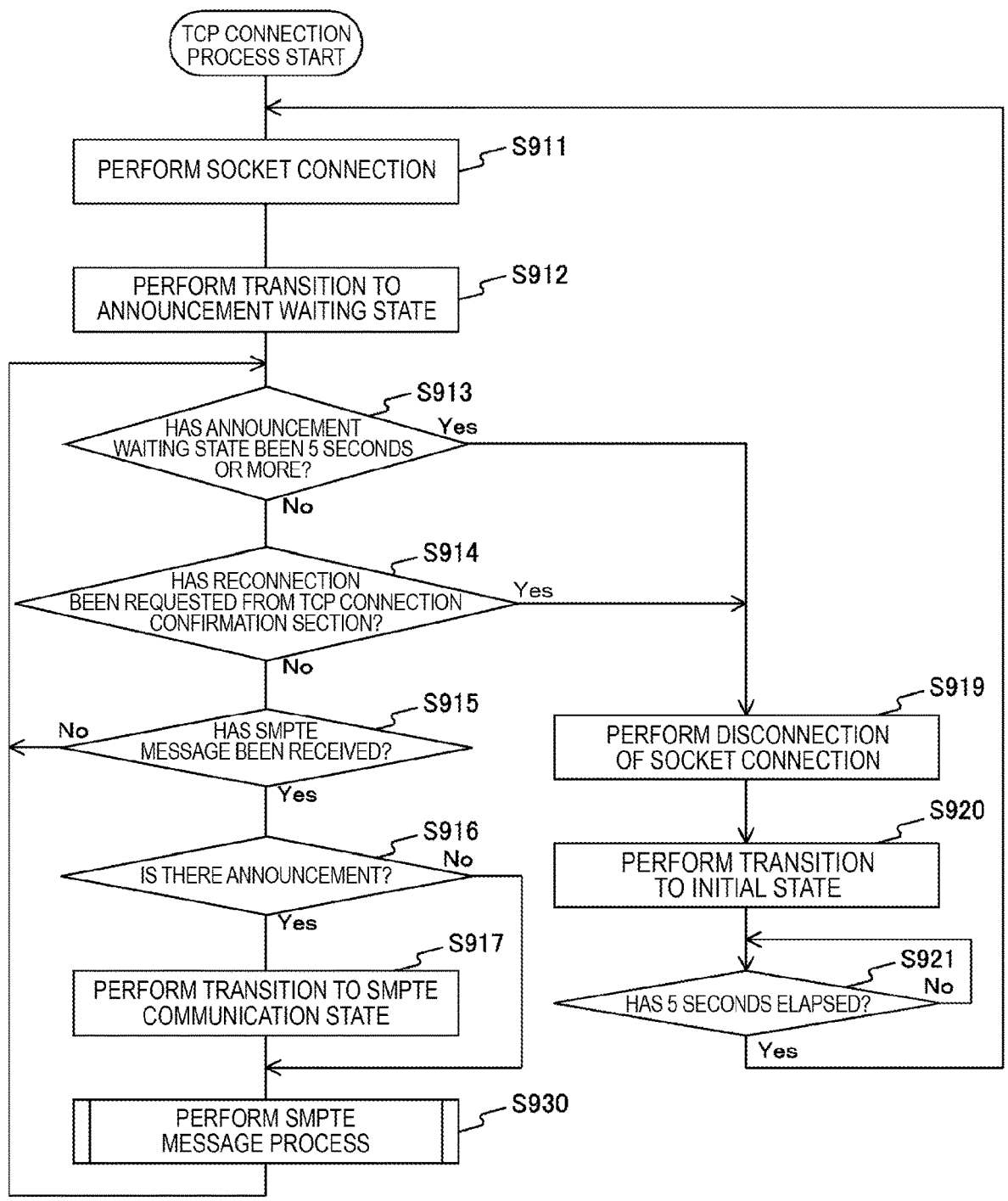
FIG. 15 is a flow chart which shows an example of a TCP connection process in the embodiments.

FIG. 15 is a flow chart which shows an example of a TCP connection process in the embodiments. For example, this TCP connection process is started by the TCP connection management section 210 in the case where the subtitle data transmission apparatus 200 starts a transmission process of subtitle data.

The TCP connection management section 210 transitions to the initial state 810, and executes a socket connection (step S911). After the completion of the socket connection, the TCP connection management section 210 transitions to the announcement waiting state 820 (step S912).

The TCP connection management section 210 judges whether or not a fixed time period (for example, 5 seconds) has elapsed after transitioning to the announcement waiting state 820 (step S913).

In the case where a fixed time period has not elapsed (step S913: No), the TCP connection management section 210 judges whether or not reconnection has been requested from the connection confirmation section 220 (step S914).

In the case where reconnection has not been requested from the connection confirmation section 220 (step S914: No), the TCP connection management section 210 judges whether or not a message has been received in the SMPTE protocol (step S915).

In the case where a message has been received in the SMPTE protocol (step S915: Yes), the TCP connection management section 210 judges whether or not this message is an announcement message (step S916).

In the case where it is an announcement message (step S916: Yes), the TCP connection management section 210 transitions to the SMPTE communication state 830 (step S917).

In the case where it is not an announcement message (step S916: No), or after step S917, the TCP connection management section 210 executes an SMPTE message process which causes the SMPTE message processing section 230 to process the received message (step S930).

In the case where a message has not been received in the SMPTE protocol (step S915: No), or after step S930, the TCP connection management section 210 returns to step S913.

In the case where a fixed time period has elapsed (step S913: Yes), or in the case where reconnection has been requested (step S914: Yes), the TCP connection management section 210 disconnects the socket connection (step S919). Then, the TCP connection management section 210 transitions to the initial state 810 (step S920).

The TCP connection management section 210 judges whether or not a fixed time period (for example, 5 seconds) has elapsed after transitioning to the initial state 810 (step S921). In the case where a fixed time period has not elapsed (step S921: No), the TCP connection management section 210 returns to step S921.

In the case where a fixed time period has elapsed (step S921: Yes), the TCP connection management section 210 returns to step S911.

Figure 16:
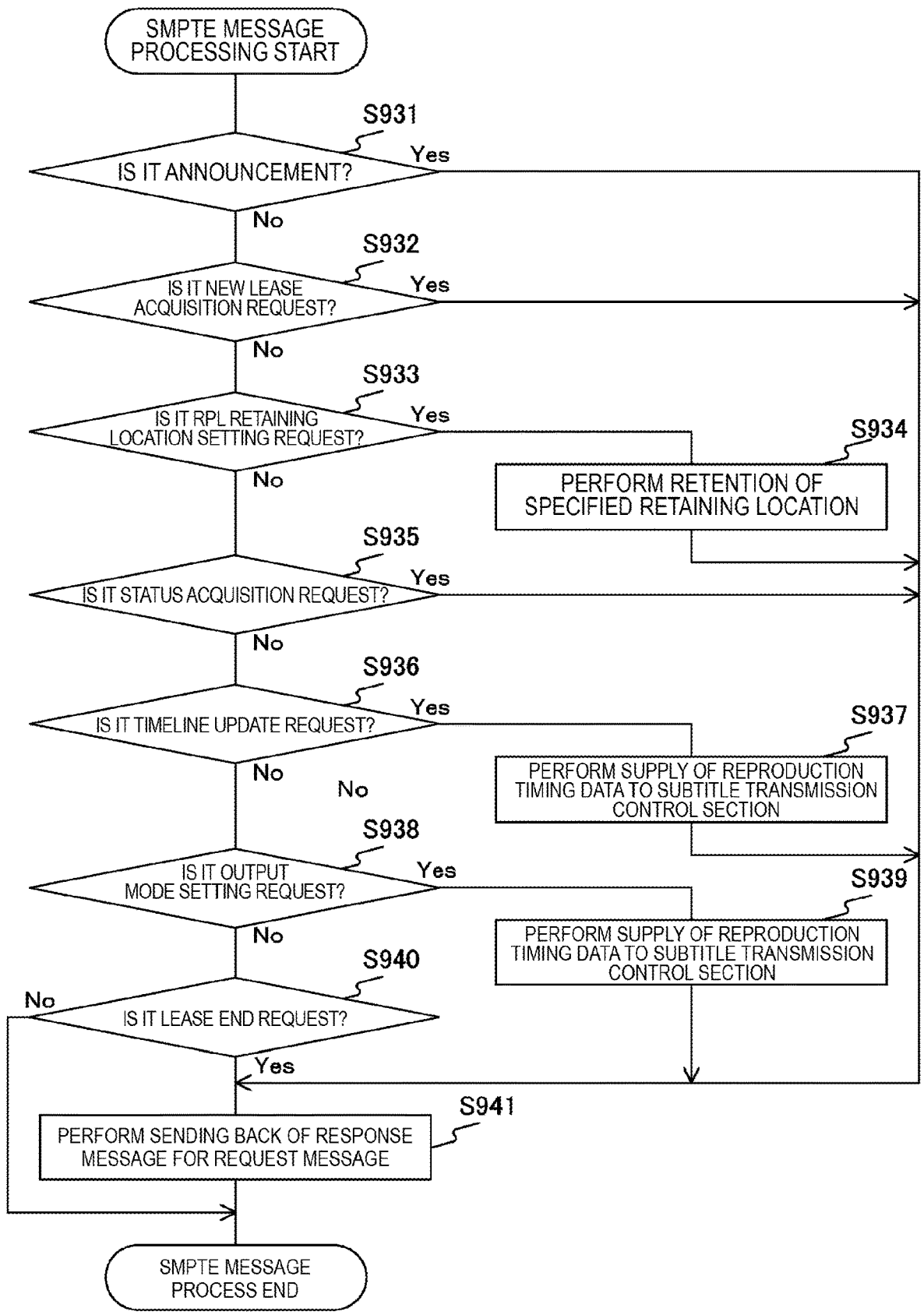
FIG. 16 is a flow chart which shows an example of an SMPTE message process in the embodiments.

FIG. 16 is an example of an SMPTE message process in the embodiments. The SMPTE message processing section 230 judges whether or not the received message is an announcement message (step S931).

If it is not an announcement message (step S931: No), the SMPTE message processing section 230 judges whether or not the received message is a new lease acquisition request message (step S932).

If it is not a new lease acquisition request message (step S932: No), the SMPTE message processing section 230 judges whether or not the received message is an RPL retaining location setting request message (step S933).

If it is an RPL retaining location setting request message (step S933: Yes), the SMPTE message processing section 230 causes the RPL file retaining location buffer 240 to retain the retaining location of the retaining location presentation file specified by this message (step S934).

If it is not an RPL retaining location setting request message (step S933: No), the SMPTE message processing section 230 judges whether or not the received message is a status acquisition request message (step S935).

If it is not a status acquisition request message (step S935: No), the SMPTE message processing section 230 judges whether or not the received message is a timeline update request message (step S936).

If it is not a timeline update request message (step S936: Yes), the SMPTE message processing section 230 acquires the present position in the timeline and content identification information from this message. Then, the SMPTE message processing section 230 supplies reproduction timing data, which includes the present position and the content identification information, to the subtitle transmission control section 280 (step S937).

If it is not a timeline update request message (step S936: No), the SMPTE message processing section 230 judges whether or not the received message is an output mode setting request message (step S938).

If it is an output mode setting request message (step S938: Yes), the SMPTE message processing section 230 acquires a specification of the start or end of reproduction and content identification information from this message. Then, the SMPTE message processing section 230 supplies reproduction timing data, which includes this specification and content identification information, to the subtitle transmission control section 280 (step S939).

If it is not an output mode setting request message (step S938: No), the SMPTE message processing section 230 judges whether or not the received message is a lease end request message (step S940).

In the case where it is an announcement message (step S931: Yes), or in the case where it is a new lease acquisition request message (step S932: Yes), the SMPTE message processing section 230 sends back a response message to these request messages (step S941).

Further, after step S934, in the case where it is a status acquisition request message (step S935: Yes), or after step S937, the SMPTE message processing section 230 sends back a response message to these request messages (step S941).

Further after step S939, or in the case where it is a lease request message (step S940: Yes), the SMPTE message processing section 230 sends back a response message to these request messages (step S941).

In the case where it is not a lease request message (step S940: No), or after step S941, the SMPTE message processing section 230 ends the SMPTE message process.

Figure 17:
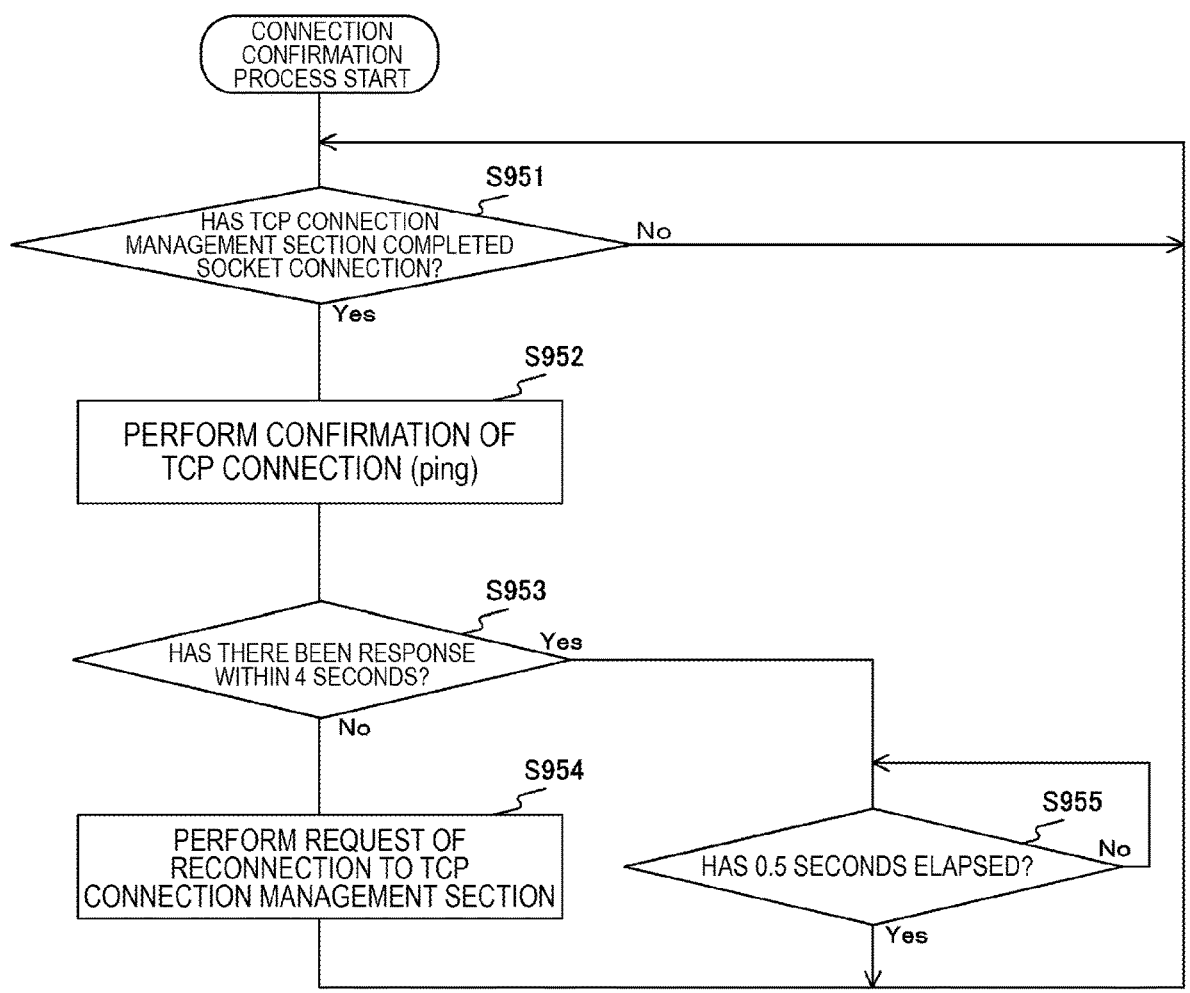
FIG. 17 is a flow chart which shows an example of a connection confirmation process in the embodiments.

FIG. 17 is a flow chart which shows an example of a connection confirmation process in the embodiments. For example, this connection confirmation process is started by the connection confirmation section 220 in the case where the subtitle data transmission apparatus 200 starts a transmission process of subtitle data.

The connection confirmation section 220 judges whether or not the TCP connection management section 210 has completed a socket connection (step S951).

If the socket connection has been completed (step S951: Yes), the connection confirmation section 220 executes a ping command or the like, in order to confirm whether or not a connection has been established by a TCP (step S952). It is judged whether or not there is a response to the ping within a prescribed time period (for example, 4 seconds) (step S953).

In the case where there has been no response within a prescribed time period (step S953: No), the connection confirmation section 220 requests reconnection to the TCP connection management section 210 (step S954).

In the case where there has been no response within a prescribed time (step S953: Yes), the connection confirmation section 220 judges whether or not a fixed time period (for example, 0.5 seconds) has elapsed, after a waiting time (4 seconds) of a response has elapsed (step S955). If a fixed time period has not elapsed (step S955: No), the connection confirmation section 220 returns to step S955.

In the case where the socket connection has not been completed (step S951: No), in the case where a fixed time period has elapsed (step S955: Yes), or after step S954, the connection confirmation section 220 returns to step S951.

Figure 18:
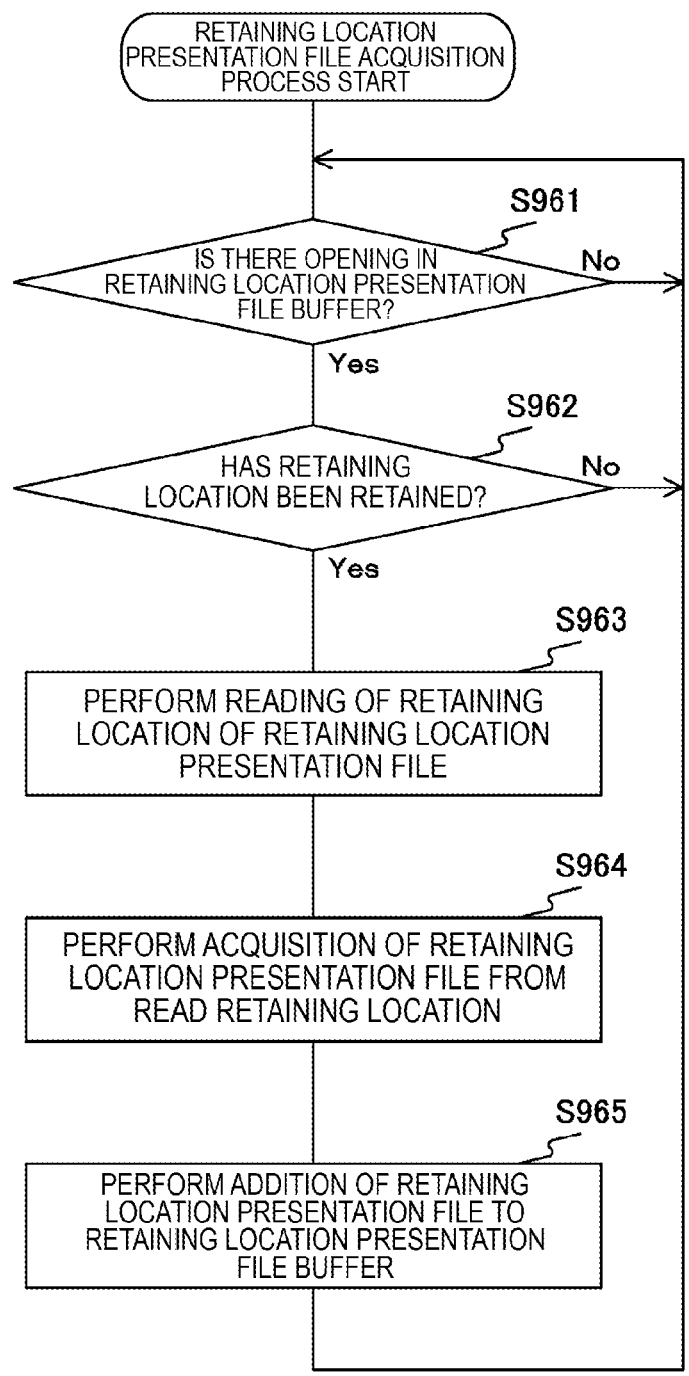
FIG. 18 is a flow chart which shows an example of a retaining location presentation file acquisition process in the embodiments.

FIG. 18 is a flow chart which shows an example of a retaining location presentation file acquisition process in the embodiments. For example, this retaining location presentation file acquisition process is started by the retaining location presentation file acquisition section 250 in the case where the subtitle data transmission apparatus 200 starts a transmission process of subtitle data. The retaining location presentation file acquisition section 250 judges whether or not there is an opening in the retaining location presentation file buffer 260 (step S961). If there is an opening (step S961: Yes), it is judged whether or not the retaining location of the retaining location presentation file has been retained in the RPL file retaining location buffer 240 (step S962).

If the retaining location of the retaining location presentation file has been retained (step S962: Yes), the retaining location presentation file acquisition section 250 reads the initially retained retaining location from the RPL file retaining location buffer 240 (step S963). The retaining location presentation file acquisition section 250 acquires the retaining location presentation file from the read retaining location (step S964). The retaining location presentation file acquisition section 250 adds the acquired retaining location presentation file to the retaining location presentation file buffer 260 (step S965).

In the case where there is no opening in the retaining location presentation file buffer 260 (step S961: No), in the case where the retaining location has not been retained (step S962: No), or after step S965, the retaining location presentation file acquisition section 250 returns to step S961.

Figure 19:
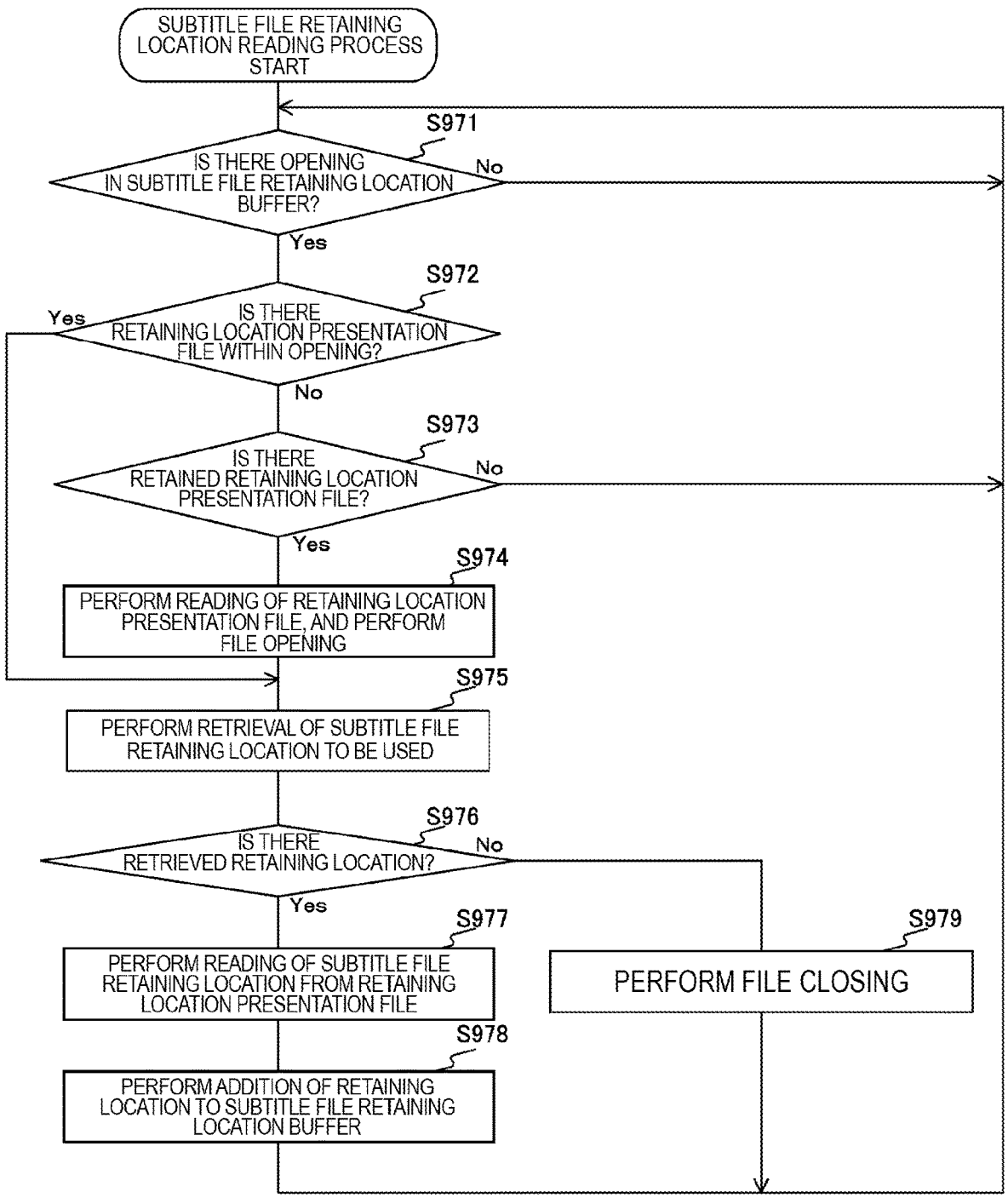
FIG. 19 is a flow chart which shows an example of a subtitle file retaining location reading process in the embodiments.

FIG. 19 is a flow chart which shows an example of a subtitle file retaining location reading process in the embodiments. For example, this subtitle file retaining location reading process is started by the subtitle file retaining location reading section 270 in the case where the subtitle data transmission apparatus 200 starts a transmission process of subtitle data. The subtitle file retaining location reading section 270 judges whether or not there is an opening in the subtitle file retaining location buffer 290 (step S971).

If there is an opening (step S971: Yes), it is judged whether or not there is a retaining location presentation file within the opening (step S972). If there is no retaining location presentation file within the opening (step S972: No), it is judged whether or not there is a retaining location presentation file retained in the retaining location presentation file buffer 260 (step S973).

If there is a retained retaining location presentation file (step S973: Yes), the subtitle file retaining location reading section 270 executes file opening by reading the retaining location presentation file for the notified content identification information (step S974). The subtitle file retaining location reading section 270 retrieves a retaining location of a subtitle file to be used, within the read retaining location presentation file. For example, the subtitle file retaining location reading section 270 retrieves a retaining location of a subtitle file related to the language identification information to which each of the subtitle file acquisition sections 300 correspond (step S975).

The subtitle file retaining location reading section 270 judges whether or not there is a retaining location of the retrieved subtitle file (step S976). If there is a retaining location of the retrieved subtitle file (step S976: Yes), the subtitle file retaining location reading section 270 reads this retaining location of the subtitle file, from the retaining location presentation file (step S977). The subtitle file retaining location reading section 270 adds the read retaining location to the subtitle file retaining location buffer 290 (step S978).

If there is no retaining location of the retrieved subtitle file (step S976: No), the subtitle file retaining location reading section 270 executes file closing of the read subtitle location presentation file (step S979).

In the case where there is no opening in the subtitle file retaining location buffer 290 (step S971: No), or in the case where there is no retained retaining location presentation file (step S973: No), the subtitle file retaining location reading section 270 returns to step S971. Further, after step S978 or S979, the subtitle file retaining location reading section 270 returns to step S971.

Figure 20:
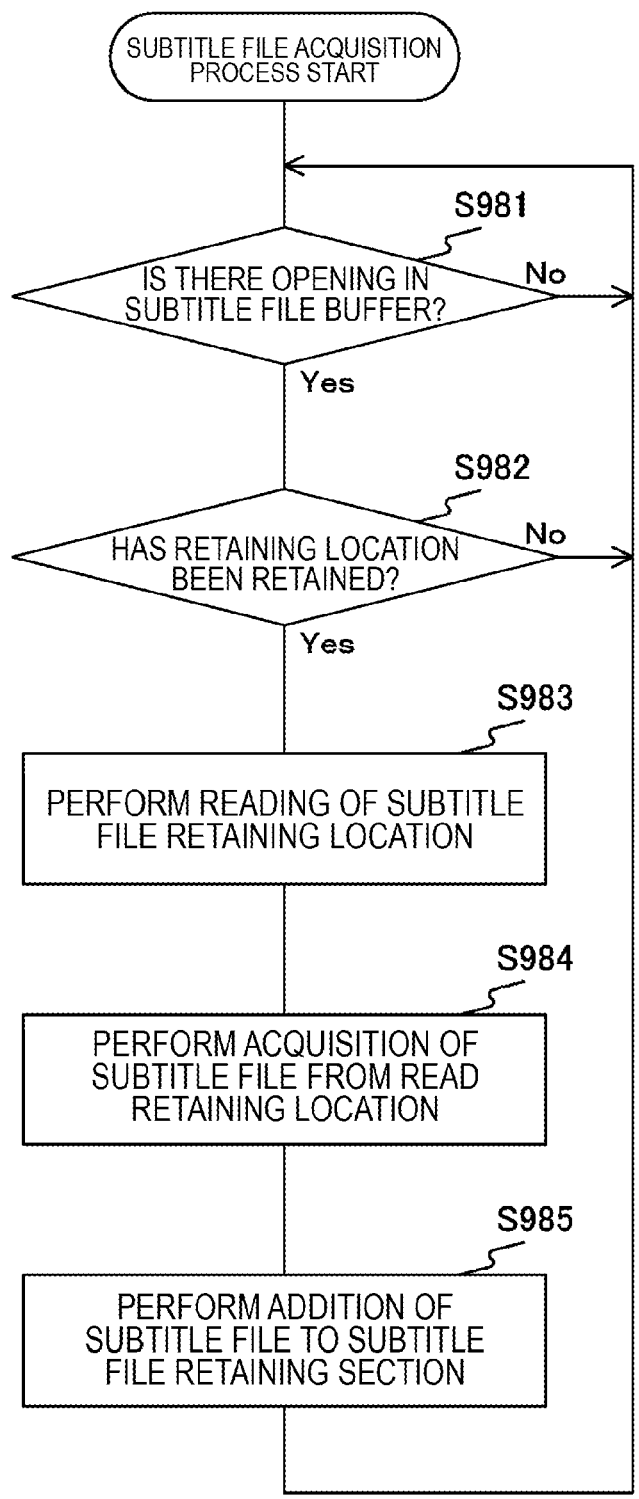
FIG. 20 is a flow chart which shows an example of a subtitle file acquisition process in the embodiments.

FIG. 20 is a flow chart which shows an example of a subtitle file acquisition process in the embodiments. For example, this subtitle file acquisition process is started by the subtitle file acquisition section 300, at the time when content identification information to be reproduced has been notified by the subtitle transmission control section 280. The subtitle file acquisition section 300 judges whether or not there is an opening in the subtitle file buffer 310 (step S981). If there is an opening (step S981: Yes), it is judged whether or not the retaining location of the subtitle file has been retained in the subtitle file retaining location buffer 290 (step S982).

If the retaining location has been retained (step S982: Yes), the subtitle file acquisition section 300 reads the notified content identification information, and the retaining location of the subtitle file corresponding to a prescribed language, from the subtitle file retaining location buffer 290 (step S983). The subtitle file acquisition section 300 acquires the subtitle file from the read retaining location (step S984). Then, the subtitle file acquisition section 300 adds the subtitle file to the subtitle file buffer 310 (step S985).

In the case where there is no opening in the subtitle file buffer 310 (step S981: No), in the case where the retaining location has not been retained (step S982: No), or after step S985, the subtitle file acquisition section 300 returns to step S981.

FIG. 21 is a flow chart which shows an example of a subtitle data reading process in the embodiments. For example, this subtitle data reading process is started by the subtitle data reading section 320, at the time when content identification information to be reproduced has been notified by the subtitle transmission control section 280.

The subtitle data reading section 320 judges whether or not there is an opening in the corresponding subtitle data buffer 331 (step S991). If there is an opening (step S991: Yes), the subtitle data reading section 320 judges whether or not there is a subtitle file within the opening (step S992). If there is no subtitle file within the opening (step S992: No), the subtitle data reading section 320 judges whether or not there is a subtitle file retained in the corresponding subtitle file buffer 310 (step S993). If there is a retained subtitle file (step S993: Yes), the subtitle data reading section 320 executes file opening, by reading the initially retained subtitle file (step S994).

In the case where there is a subtitle file within the opening (step S992: Yes), or after step S994, the subtitle data reading section 320 extracts necessary subtitle data from the read subtitle file. For example, the subtitle data reading section 320 extracts subtitle data from the present position of the timeline onwards as necessary subtitle data (step S995). The subtitle data reading section 320 judges whether or not the necessary subtitle data has been extracted (step S996). In the case where it has been extracted (step S996: Yes), the subtitle data reading section 320 supplies the extracted subtitle data to the subtitle transmission schedule management section 330 (step S997). In the case where subtitle data has not been extracted from the read subtitle file (step S996: No), the subtitle data reading section 320 executes file closing of this subtitle file (step S998).

In the case where there is no opening in the subtitle data buffer 331 (step S991: No), in the case where there is no retained subtitle file (step S993: No), or after step S997 or S998, the subtitle data reading section 320 returns to step S991.

In this way, according to the embodiments of the present disclosure, by confirming whether or not a connection has been established in accordance with a TCP, during SMPTE communication, the subtitle data transmission apparatus 200 can establish this connection in the case where a connection has not been established. Accordingly, reconnection by the subtitle data transmission apparatus 200 can be performed, even if the connection has been disconnected due to communication interference in a system which uses a protocol (SMPTE or the like) in which a procedure for confirming the communication state with a server is not provided. As a result of this, the subtitle data being cut off is prevented.

2. Modified Example

Confirmation Example of the Subtitle Data

FIG. 22 is a figure which shows a description example of subtitle data in a modified example. The subtitle data transmission apparatus 200 according to this modified example is different to that of the above described embodiments, for the point in which an Interop protocol is used instead of an SMPTE protocol. As shown in FIG. 22, content identification information 312-1 is described as an element of a "Subtitle Id" tag by Interop. There are minute differences is the description format of the language identification information 312-2, the display start time 312-3 and the display end time 312-4. For example, "en" is described as language identification information which represents English in SMPTE, while in contrast, "English" is described in Interop. Further, the time is described in frame units in SMPTE, while in contrast, the time is described in second units in Interop. The description of the character string information 312-5 is the same as that of SMPTE. In this way, while the description method or the like is partly different, all information which may be necessary for distribution control of subtitles (the content identification information 312-1 or the like) is included in subtitle data of the modified example. Accordingly, the subtitle data transmission apparatus 200 of the modified example can perform control the same as that of the embodiments, and can prevent the distribution of display information from being interrupted, even in the case where an Interop protocol is used instead of SMPTE.

Note that, the subtitle data transmission apparatus 200 can use a protocol other than an SMPTE protocol or an Interop protocol, if it is a protocol for controlling the distribution of display information.

The above-described embodiments are examples for embodying the present technology, and matters in the embodiments each have a corresponding relationship with invention-specific matters in the claims. Likewise, the matters in the embodiments and the invention-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disk), a memory card, and a Blu-ray disc (registered trademark) can be used.

(1) A communication device including:
a message processing section which, in a case where a connection has been established with a server which distributes display information to be displayed on a display device in synchronization with reproduction of content, processes a message from the server for controlling the distribution in accordance with a first protocol;
a connection confirmation section which confirms whether or not the connection has been established in accordance with a second protocol; and
a connection request section which, in a case where the connection has not been established, requests establishment of the connection to the server in accordance with the second protocol.

(2) The communication device according to (1),
wherein, in a case where the control has not started within a fixed time period after the connection has been established by a start message which is the message specifying a start of the control, or in a case where the connection has not been established, the connection request section requests establishment of the connection in accordance with the second protocol to the server.

(3) The communication device according to (1) or (2),
wherein the connection confirmation section confirms whether or not the connection has been established in accordance with the second protocol at fixed intervals.

(4) The communication device according to any one of (1) to (3), further including:
a file acquisition section which acquires a file including the display information from a retaining location set in accordance with a retaining location setting request message which is the message requesting setting of the retaining location of the file;
a file buffer which retains the acquired file in association with the content; and
a transmission section which transmits the display information corresponding to the content specified by a content specification message which is the message specifying content to be reproduced from among display information within the retained file.

(5) The communication device according to (4),
wherein the file acquisition section identifies languages which use character strings included in the display information, and causes the file buffer to retain the file for each combination of the content and languages, and wherein the transmission section transmits the display information corresponding to the content specified from among the display information within the file based on the languages.
(6) The communication device according to any one of (1) to (5),
wherein the display device is a head-mounted display.
(7) A communication system including:
a server which distributes display information to be displayed on a display device in synchronization with reproduction of content; and
a communication device including a message processing section which, in a case where a connection has been established with the server, processes a message from the server for controlling the distribution in accordance with a first protocol, a connection confirmation section which confirms whether or not the connection has been established in accordance with a second protocol, and a connection request section which, in a case where the connection has not been established, requests establishment of the connection to the server in accordance with the second protocol.
(8) A control method of a communication device, the control method including:
a message processing procedure in which a message processing section, in a case where a connection has been established with a server which distributes display information to be displayed on a display device in synchronization with reproduction of content, processes a message from the server for controlling the distribution in accordance with a first protocol;
a connection confirmation procedure in which a connection confirmation section confirms whether or not the connection has been established in accordance with a second protocol; and
a connection request procedure in which a connection request section, in a case where the connection has not been established, requests establishment of the connection to the server in accordance with the second protocol.
(9) A program for causing a computer to function as:
a message processing procedure in which a message processing section, in a case where a connection has been established with a server which distributes display information to be displayed on a display device in synchronization with reproduction of content, processes a message from the server for controlling the distribution in accordance with a first protocol;
a connection confirmation procedure in which a connection confirmation section confirms whether or not the connection has been established in accordance with a second protocol; and
a connection request procedure in which a connection request section, in a case where the connection has not been established, requests establishment of the connection to the server in accordance with the second protocol.

REFERENCE SIGNS LIST 100 subtitle distribution server
110 retaining location presentation file storage section
120 subtitle file storage section
130 TCP/IP communication section
140 SMPTE communication section
150 router
200 subtitle data transmission apparatus
210 TCP connection management section
220 connection confirmation section
230 SMPTE message processing section
240 RPL file retaining location buffer
250 retaining location presentation file acquisition section
260 retaining location presentation file buffer
270 subtitle file retaining location reading section
280 subtitle transmission control section
290 subtitle file retaining location buffer
300 subtitle file acquisition section
310 subtitle file buffer
320 subtitle data reading section
330 subtitle transmission schedule management section
331 subtitle data buffer
332 transmission subtitle data reading section
340 subtitle data transmission section
400 subtitle data display device
410 subtitle data reception section
420 reception subtitle data buffer
430 language selection section
440 display subtitle data generation section
450 display subtitle data buffer
460 display section

The invention claimed is:
1. A communication device, comprising:
circuitry configured to:
establish a first connection with a server based on a first protocol, wherein the first protocol corresponds to a TCP/IP protocol;
switch to a waiting state based on the establishment of the first connection in the first protocol;
receive, in the waiting state, a first message from the server, wherein
the first message is an announcement message,
the first message is received from the server in a second protocol based on the establishment of the first connection in the first protocol,
the second protocol corresponds to a Society of Motion Picture and Television Engineers (SMPTE) protocol,
the second protocol is different from the first protocol,
the first message controls a start of distribution of display information from the server, and
the display information is displayed on a display device in synchronization with reproduction of content;
switch to a specific communication state from the waiting state based on the received first message;
receive, in the specific communication state, a second message from the server, wherein
the second message is received in the second protocol, and
the second message corresponds to the distribution of the display information in the second protocol;
determine a type of the received second message;
process, in the specific communication state, the received second message based on the type of the received second message, wherein the received second message is processed in the second protocol;
control the server to start the distribution of the display information for display on the display device, wherein
the server is controlled based on the determined type of the received second message;

transmit a connection confirmation message to the server based on the first protocol;
confirm disconnection from the server based on an unsuccessful reception of a response message from the server within a fixed time period, wherein
the unsuccessful reception is subsequent to the transmission of the connection confirmation message, and
the confirmation of the disconnection is subsequent to the establishment of the first connection with the server;
request establishment of a second connection with the server based on
the first protocol, and
the confirmation of the disconnection from the server;
switch from the waiting state to an initial state based on a failure of reception of the announcement message within a first time period;
determine a second time period has elapsed after the switch from the waiting state to the initial state; and
establish a third connection with the server based on the first protocol and the determination that the second time period has elapsed.

2. The communication device according to claim 1, wherein
the circuitry is further configured to request establishment of a fourth connection to the server based on
the first protocol, and
a lack of the establishment of the first connection with the server.

3. The communication device according to claim 1, wherein
the circuitry is further configured to confirm the establishment of the first connection based on the first protocol, and
the establishment of the first connection is confirmed at fixed intervals.

4. The communication device according to claim 1, wherein the circuitry is further configured to:
acquire a file from a retaining location of the file, wherein
the file includes the display information,
the type of the received second message is a retaining location setting request message,
the retaining location of the file is based on the retaining location setting request message, and
the retaining location setting request message requests setting of the retaining location of the file;
retain the acquired file in association with the content; and
transmit the display information corresponding to the content, wherein
the type of the received second message is a content specification message, and
the content specification message specifies the content to be reproduced from the display information within the retained file.

5. The communication device according to claim 4, wherein
the display information includes character strings, and
the circuitry is further configured to:
identify at least one language;
retain the file in a file buffer for each combination of the content and the at least one language; and
transmit the display information based on the at least one language, wherein the display information corresponds to the content specified from the display information within the file.

6. The communication device according to claim 1, wherein the display device is a head-mounted display.

7. A communication system, comprising:
a server configured to distribute display information for display on a display device, wherein
the display information is displayed in synchronization with reproduction of content, and
the distribution of the display information is based on a first protocol, wherein the first protocol corresponds to a Society of Motion Picture and Television Engineers (SMPTE) protocol; and
a communication device including one or more processors configured to:
establish a first connection with the server based on a second protocol, wherein the second protocol corresponds to a TCP/IP protocol;
switch to a waiting state based on the establishment of the first connection in the second protocol;
receive, in the waiting state, a first message from the server, wherein
the first message is an announcement message,
the first message is received from the server in the first protocol based on the establishment of the first connection in the second protocol,
the first protocol is different from the second protocol, and
the first message controls a start of distribution of display information from the server;
switch to a specific communication state from the waiting state based on the received first message;
receive, in the specific communication state, a second message from the server, wherein
the second message is received in the first protocol, and
the second message corresponds to the distribution of the display information in the first protocol;
determine a type of the received second message;
process, in the specific communication state, the received second message based on the type of the received second message, wherein the received second message is processed in the first protocol;
control the server to start the distribution of the display information, wherein the server is controlled based on the determined type of the received second message;
transmit a connection confirmation message to the server based on the second protocol;
confirm disconnection from the server based on an unsuccessful reception of a response message from the server within a fixed time period, wherein
the unsuccessful reception is subsequent to the transmission of the connection confirmation message, and
the confirmation of the disconnection is subsequent to the establishment of the first connection with the server;
request establishment of a second connection with the server based on
the second protocol, and
the confirmation of the disconnection from the server;
switch from the waiting state to an initial state based on a failure of reception of the announcement message within a first time period;
determine a second time period has elapsed after the switch from the waiting state to the initial state; and establish a third connection with the server based on the second protocol and the determination that the second time period has elapsed.

8. A control method, comprising:

in a communication device:
- establishing a first connection with a server based on a first protocol, wherein the first protocol corresponds to a TCP/IP protocol;
- switching to a waiting state based on the establishment of the first connection in the first protocol;
- receiving, in the waiting state, a first message from the server, wherein
  - the first message is an announcement message,
  - the first message is received from the server in a second protocol based on the establishment of the first connection in the first protocol,
  - the second protocol corresponds to a Society of Motion Picture and Television Engineers (SMPTE) protocol,
  - the second protocol is different from the first protocol,
  - the first message controls a start of distribution of display information from the server, and
  - the display information is displayed on a display device in synchronization with reproduction of content;
- switching to a specific communication state from the waiting state based on the received first message;
- receiving, in the specific communication state, a second message from the server, wherein
  - the second message is received in the second protocol, and
  - the second message corresponds to the distribution of the display information in the second protocol;
- determining a type of the received second message;
- processing, in the specific communication state, the received second message based on the type of the received second message, wherein the received second message is processed in the second protocol;
- controlling the server to start the distribution of the display information for display on the display device, wherein
  - the server is controlled based on the determined type of the received second message;
- transmitting a connection confirmation message to the server based on the first protocol;
- confirming disconnection from the server based on an unsuccessful reception of a response message from the server within a fixed time period, wherein
  - the unsuccessful reception is subsequent to the transmission of the connection confirmation message, and
  - the confirmation of the disconnection is subsequent to the establishment of the first connection with the server;
- requesting establishment of a second connection with the server based on
  - the first protocol, and
  - the confirmation of the disconnection from the server;
- switching from the waiting state to an initial state based on a failure of reception of the announcement message within a first time period;
- determining a second time period has elapsed after the switch from the waiting state to the initial state; and
- establishing a third connection with the server based on the first protocol and the determination that the second time period has elapsed.

9. A non-transitory computer-readable medium having stored thereon computer-executable instructions that, when executed by a processor, cause the processor to execute operations, the operations comprising:
- establishing a first connection with a server based on a first protocol, wherein the first protocol corresponds to a TCP/IP protocol;
- switching to a waiting state based on the establishment of the first connection in the first protocol;
- receiving, in the waiting state, a first message from the server, wherein
  - the first message is an announcement message,
  - the first message is received from the server in a second protocol based on the establishment of the first connection in the first protocol,
  - the second protocol corresponds to a Society of Motion Picture and Television Engineers (SMPTE) protocol,
  - the second protocol is different from the first protocol,
  - the first message controls a start of distribution of display information from the server, and
  - the display information is displayed on a display device in synchronization with reproduction of content;
- switching to a specific communication state from the waiting state based on the received first message;
- receiving, in the specific communication state, a second message from the server, wherein
  - the second message is received in the second protocol, and
  - the second message corresponds to the distribution of the display information in the second protocol;
- determining a type of the received second message;
- processing, in the specific communication state, the received second message based on the type of the received second message, wherein the received second message is processed in the second protocol;
- controlling the server to start the distribution of the display information for display on the display device, wherein
  - the server is controlled based on the determined type of the received second message;
- transmitting a connection confirmation message to the server based on the first protocol;
- confirming disconnection from the server based on an unsuccessful reception of a response message from the server within a fixed time period, wherein
  - the unsuccessful reception is subsequent to the transmission of the connection confirmation message, and
  - the confirmation of the disconnection is subsequent to the establishment of the first connection with the server;
- requesting establishment of a second connection with the server based on
  - the first protocol, and
  - the confirmation of the disconnection from the server;
- switching from the waiting state to an initial state based on a failure of reception of the announcement message within a first time period;
- determining a second time period has elapsed after the switch from the waiting state to the initial state; and
- establishing a third connection with the server based on the first protocol and the determination that the second time period has elapsed.

* * * * *